(12) United States Patent
Ichikawa

(10) Patent No.: US 10,692,319 B2
(45) Date of Patent: Jun. 23, 2020

(54) MONITORING TERMINAL DEVICE AND DISPLAY PROCESSING METHOD

(71) Applicant: KYOCERA Document Solutions Inc., Osaka (JP)

(72) Inventor: Daisuke Ichikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/344,282

(22) PCT Filed: Aug. 7, 2018

(86) PCT No.: PCT/JP2018/029663
§ 371 (c)(1),
(2) Date: Apr. 23, 2019

(87) PCT Pub. No.: WO2019/064947
PCT Pub. Date: Apr. 4, 2019

(65) Prior Publication Data
US 2019/0272692 A1   Sep. 5, 2019

(30) Foreign Application Priority Data
Sep. 28, 2017 (JP) ................................. 2017-187776

(51) Int. Cl.
| G07C 9/00 | (2020.01) |
| G07C 9/37 | (2020.01) |
| H04N 7/18 | (2006.01) |
| G08B 25/00 | (2006.01) |
| G08B 25/04 | (2006.01) |
| G08B 13/196 | (2006.01) |

(52) U.S. Cl.
CPC ................. *G07C 9/37* (2020.01); *G07C 9/00* (2013.01); *G08B 25/00* (2013.01); *G08B 25/04* (2013.01); *H04N 7/18* (2013.01); *G06T 2207/30196* (2013.01); *G08B 13/19613* (2013.01)

(58) Field of Classification Search
CPC ....... G07C 9/37; G07C 9/00; G08B 13/19613
USPC .......................................................... 340/5.2
See application file for complete search history.

(56) References Cited

U.S. PATENT DOCUMENTS

2009/0244281 A1* 10/2009 Hiromasa .......... G08B 13/1961
348/143

FOREIGN PATENT DOCUMENTS

JP          2009-239467 A     10/2009

* cited by examiner

*Primary Examiner* — Vernal U Brown
(74) *Attorney, Agent, or Firm* — Studebaker & Brackett PC

(57) ABSTRACT

A monitoring terminal device (2) is a device for monitoring users entering and exiting an area. A controller (14) specifies each user entering the area as a first monitoring target or a first non-monitoring target in a first entry image and a first exit image. The first entry image and the first exit image exhibit the same first monitoring target. The first entry image includes an image of at least one user entering the area (22). The first exit image includes an image of at least one user exiting the area. The controller (14) creates a second entry image by performing a first marking process on the first entry image. The controller (14) creates a second exit image by performing a second marking process on the first exit image. An image display section (18) displays at least one of the second entry image and the second exit image.

12 Claims, 26 Drawing Sheets

MONITORING TERMINAL DEVICE AND DISPLAY PROCESSING METHOD

TECHNICAL FIELD

The present invention relates to a monitoring terminal device and a display processing method.

BACKGROUND ART

In conventional monitoring using a monitoring terminal device, monitoring personnel views and checks a picture displayed on an image display section of the monitoring terminal device. For example, Patent Literature 1 discloses a monitoring terminal device that displays a picture captured at a time when a monitoring target was entering a monitored area concurrently with a picture captured at a time when the monitoring target was exiting the monitored area for monitoring personnel to view the picture of the monitoring target exiting the monitored area.

CITATION LIST

Patent Literature

[Patent Literature 1]
Japanese Patent Application Laid-Open Publication No. 2009-239467

SUMMARY OF INVENTION

Technical Problem

However, the technique disclosed in Patent Literature 1 assumes that a single user enters and exits the monitored area, and is therefore insufficient for efficient monitoring where a plurality of users enter and exit an area. For example, it is difficult to distinguish an image of a monitoring target of interest and check an action of the monitoring target in an image exhibiting a plurality of users.

The present invention was achieved in consideration of the above problem and an object thereof is to provide a monitoring terminal device and a display processing method that enable efficient monitoring of a plurality of users entering and exiting a specific area.

Solution to Problem

A monitoring terminal device according to the present invention is a device for monitoring at least one user entering a specific area through an entrance gate of the specific area and at least one user exiting the specific area through an exit gate of the specific area. Either or both of the at least one user entering the specific area and the at least one user exiting the specific area is a plurality of users. The monitoring terminal device includes a controller and an image display section. The controller acquires a first entry image including one or more images of one or more users entering the specific area and specifies each of the users entering the specific area as a first monitoring target or a first non-monitoring target in the first entry image. The controller performs a first marking process on the image of every first monitoring target or the image of every first non-monitoring target in the first entry image to create a second entry image. The controller acquires a first exit image including one or more images of one or more users exiting the specific area and exhibiting the first monitoring target included in the first entry image subjected to the first marking process, and specifies each of the users exiting the specific area as the first monitoring target or the first non-monitoring target in the first exit image. The controller performs a second marking process on the image of every first monitoring target or the image of every first non-monitoring target in the first exit image to create a second exit image. The image display section displays at least one of the second entry image including the image of the first monitoring target and the second exit image including the image of the same first monitoring target.

A display processing method according to the present invention is performed by a monitoring terminal device. The monitoring terminal device includes a reception section, a controller, storage, an image display section, and an input section. The display processing method includes primarily acquiring, secondarily acquiring, primarily determining, image set creating, specifying, performing a first marking process, performing a second marking process, and image displaying. In the primarily acquiring, the controller acquires user entry information from a first entry image received by the reception section. The first entry image exhibits one or more users entering a specific area. The user entry information indicates the respective users entering the specific area. In the secondarily acquiring, the controller acquires user exit information from a first exit image received by the reception section. The first exit image exhibits one or more users exiting the specific area. The user exit information indicates the respective users exiting the specific area. In the primarily determining, the controller determines whether or not the first entry image and the first exit image exhibit the same user based on the first entry image, the user entry information, the first exit image, and the user exit information. In the image set creating, upon the controller determining that the first entry image and the first exit image exhibit the same user in the primarily determining, the controller creates an image set with respect to this specific user by associating the first entry image and the first exit image. In the specifying, the controller specifies each of the users entering the specific area among all users exhibited by the first entry image displayed on the image display section as a first monitoring target or a first non-monitoring target based on a result of determination by monitoring personnel who performs monitoring, upon the monitoring personnel determining to monitor one of the users entering the specific area. In the performing a first marking process, the controller performs a first marking process on an image of every first monitoring target or an image of every first non-monitoring target in the first entry image to create a second entry image. In the performing a second marking process, after the controller specifying each of the users exhibited by the first exit image subjected to the first marking process as the first monitoring target or the first non-monitoring target based on the result of the determination, the controller performs a second marking process on an image of every first monitoring target or an image of every first non-monitoring target in the first exit image to create a second exit image. In the image displaying, the controller displays the first entry image or the second entry image that includes the image of the first monitoring target and the first exit image or the second exit image that includes the image of the same first monitoring target on the image display section.

Advantageous Effects of Invention

A monitoring terminal device and a display processing method according to the present invention enable efficient monitoring of a plurality of users entering and exiting a specific area.

DESCRIPTION OF EMBODIMENTS

Figure 1:
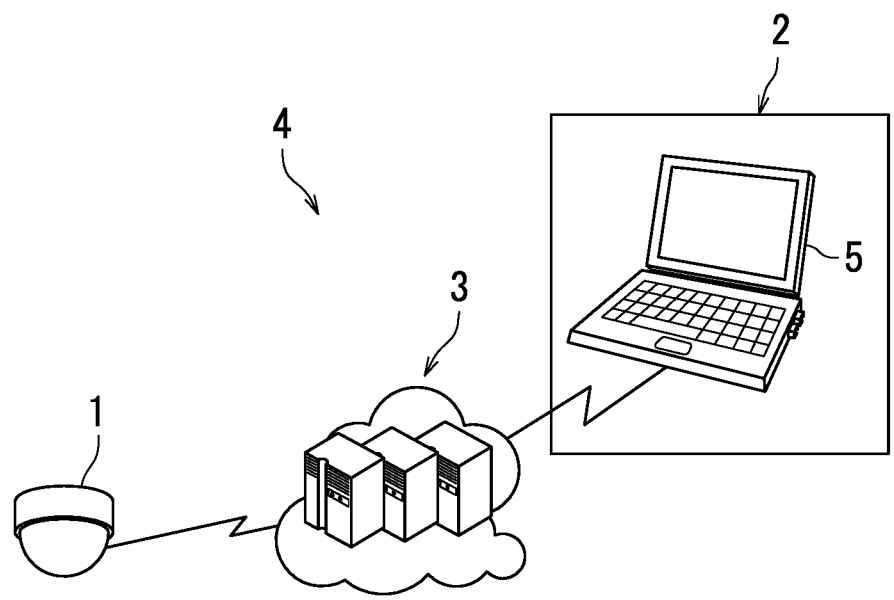
FIG. 1 is a diagram illustrating a configuration of a monitoring system including a monitoring terminal device according to a first embodiment of the present invention.

The following describes embodiments of the present invention with reference to the accompanying drawings. Note that in the drawings, elements that are the same or substantially equivalent are labelled using the same reference signs and description thereof is not repeated. The drawings are schematic illustrations that emphasize elements of configuration in order to facilitate understanding thereof.

First Embodiment

The following first describes a monitoring system including a monitoring terminal device according to a first embodiment with reference to FIG. 1. FIG. 1 is a diagram illustrating a configuration of the monitoring system including the monitoring terminal device according to the first embodiment. As illustrated in FIG. 1, a monitoring system 4 includes a capture section 1, a monitoring terminal device 2, and a monitoring device 3.

The monitoring terminal device 2 includes an image display section. An image at a time of entry into a specific area and an image at a time of exit from the specific area are displayed on the image display section of the monitoring terminal device 2. Monitoring personnel who performs monitoring views the image at the time of entry into the specific area and the image at the time of exit from the specific area on the image display section.

The monitoring terminal device 2 is for example a fixed terminal device 5 such as a personal computer (PC) or a large-capacity mobile terminal device such as a tablet PC. The fixed terminal device 5 is placed in a monitoring room where the specific area is monitored. The monitoring terminal device 2 includes the image display section that displays images. The image display section is for example a liquid-crystal display or an organic electroluminescence (EL) display. The monitoring terminal device 2 displays images transmitted from the monitoring device 3 on the image display section.

The monitoring terminal device 2 is a device for monitoring at least one user entering the specific area and at least one user exiting the specific area. Either or both of the at least one user entering the specific area and the at least one user exiting the specific area is a plurality of users.

The monitoring device 3 monitors a user who passes through an entrance gate, an exit gate, or an entrance and exit gate of the specific area. The monitoring device 3 is for example a server.

The capture section 1 captures images of a target area, which is an area including the entrance gate, the exit gate, or the entrance and exit gate of the specific area. The capture section 1 is installed in the vicinity of the entrance gate, the exit gate, or the entrance and exit gate of the specific area. The monitoring system 4 may include a plurality of capture sections 1. That is, the number of capture sections 1 varies depending on the number of gates such as the entrance gate, the exit gate, and the entrance and exit gate of the specific area. Specifically, the specific area may have two entrance and exit gates, and the monitoring system 4 may need, for each of the entrance and exit gates, one capture section 1 for entry monitoring that captures images of user entry and one capture section 1 for exit monitoring that captures images of user exit. In such a case, the monitoring system 4 includes four capture sections 1. The capture section 1 is a security camera. The capture section 1 is installed facing in a direction of user entry and exit so as to capture images of an entrance gate 26a from a user face side.

Figure 2:
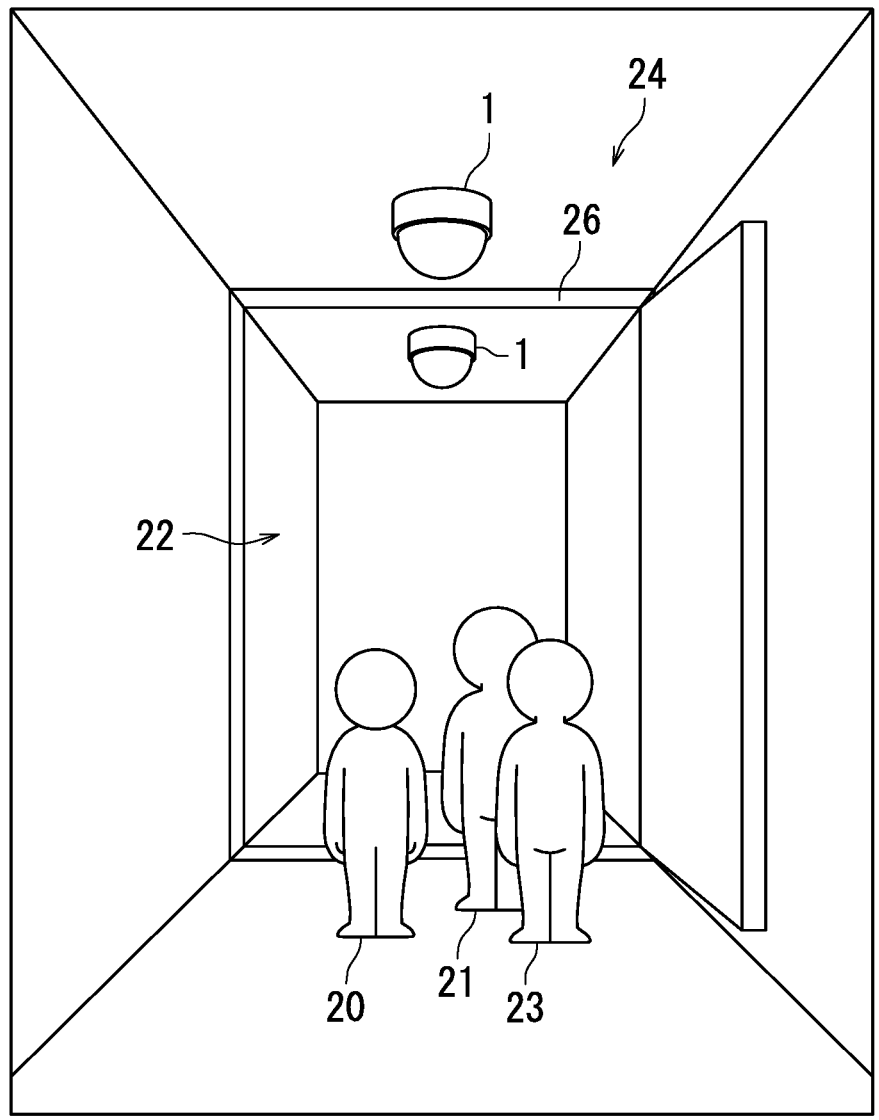
FIG. 2 is a diagram illustrating users each entering or exiting a specific area.

The following describes the capture section 1 of the monitoring system 4 including the monitoring terminal device 2 according to the first embodiment with reference to FIG. 2. FIG. 2 is a diagram illustrating users each entering or exiting the specific area. A user 21 and a user 23 are entering a specific area 22 from a non-specific area 24 outside of the specific area 22 through an entrance and exit gate 26 (also referred below as the entrance gate 26a or an exit gate 26b). The capture section 1 installed in the specific area 22 is a capture section for entry monitoring that captures a first entry image exhibiting the users 21 and 23 entering the specific area 22. A user 20 is exiting the specific area 22 to the non-specific area 24 through the entrance and exit gate 26. The capture section 1 installed in the non-specific area 24 is a capture section for exit monitoring that captures a first exit image exhibiting the user 20 exiting the specific area 22. The first entry image and the first exit image are still or video.

Figure 3:
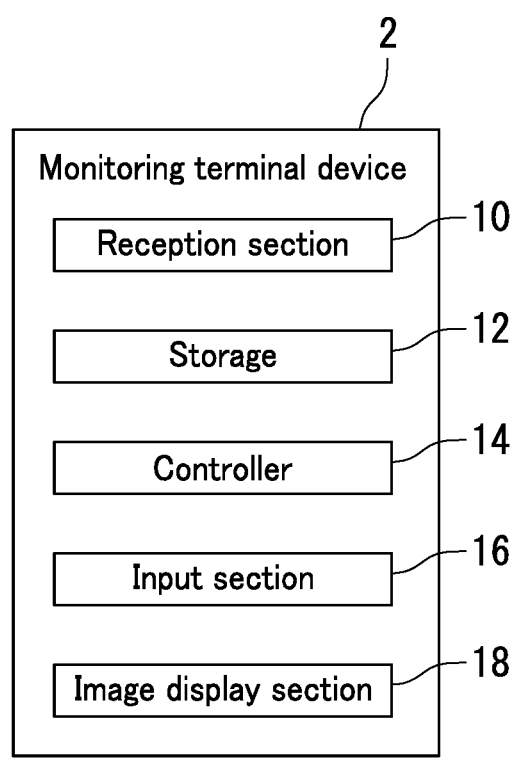
FIG. 3 is a block diagram illustrating a configuration of the monitoring terminal device according to the first embodiment of the present invention.

The following describes a configuration of the monitoring terminal device 2 according to the first embodiment with reference to FIGS. 1 to 4. FIG. 3 is a block diagram illustrating the configuration of the monitoring terminal device 2 according to the first embodiment.

As illustrated in FIG. 3, the monitoring terminal device 2 according to the first embodiment includes a reception section 10, storage 12, a controller 14, an input section 16, and an image display section 18.

The reception section 10 receives the first entry image and the first exit image. The first entry image exhibits the users 21 and 23 entering the specific area 22 through the entrance gate 26a of the specific area 22. The first exit image exhibits the user 20 exiting the specific area through the exit gate 26b of the specific area 22. The reception section 10 for example receives the first entry image and the first exit image captured by the capture sections 1 via a network such as a LAN, a WAN, or an Internet connection.

The monitoring personnel inputs, with respect to each of the users, information determining whether or not to monitor the user by using the input section 16. Specifically, with respect to each of the users 21 and 23 entering the specific area 22 among the users 20, 21, and 23 exhibited by the first entry image displayed on the image display section 18, the monitoring personnel determines whether or not to monitor the user by using the input section 16. The input section 16 is for example a keyboard or a touch panel.

The controller 14 acquires user entry information and user exit information. The controller 14 for example includes a processor such as a central processing unit (CPU) or a computing circuit. The user entry information indicates the respective users 21 and 23 entering the specific area 22 based on the first entry image. The user entry information is for example facial images (specific examples include size, shape, and positional relationship of eyes, nose, and mouth; iris color; hair style; hair color; and presence or absence of glasses), gait (specific examples include stride, walking velocity, walking posture, and walking rhythm), physical size, silhouette, what the users are wearing (specific examples include clothes, shoes, glasses, watch, cap, and mask), and belongings (specific examples include document, package, and cane) of the respective users 21 and 23 entering the specific area 22. The user exit information indicates the user 20 exiting the specific area 22 based on the first exit image. The user exit information is for example a facial image, gait, physical size, silhouette, what the user is wearing, and belongings of the user 20 exiting the specific area 22.

The controller 14 determines whether or not the first entry image and the first exit image exhibit the same user based on the user entry information and the user exit information. For example, the controller 14 compares the first entry image including images of the users 21 and 23 with the first exit image to determine whether or not the first exit image includes either or both of the image of the user 21 and the image of the user 23. This determination process is performed on one or more first exit images until a first exit image including either or both of the image of the user 21 and the image of the user 23 is found.

The controller 14 specifies each of the users entering the specific area as a first monitoring target or a first non-monitoring target based on a result of the determination as to "whether or not the monitoring personnel is to monitor the user".

The controller 14 performs a first marking process on the image of every first monitoring target or the image of every first non-monitoring target in the first entry image to create a second entry image. The first marking process means image processing for making the image of the first monitoring target or the image of the first non-monitoring target distinguishable in the second entry image. The first marking process may for example be a process of reducing brightness of an image of every first non-monitoring target, a process of increasing brightness of an image of every first monitoring target, a process of adding a color to an image of every first monitoring target, or a process of outlining a contour of an image of every first monitoring target. The monitoring personnel can select and set a specific type of image processing as the first marking process. The process of reducing or increasing brightness is to make a desired image distinguishable by increasing a degree of difference between light and dark parts (contrast) of an image including the desired image. Note that the process of reducing brightness of an image of every first non-monitoring target gives an image density to the image of every first non-monitoring target to such a degree that appearance of the first non-monitoring target is recognizable.

The controller 14 acquires the first exit image associated with the first entry image subjected to the first marking process as part of an image set with respect to the first monitoring target and specifies each user exhibited by the first exit image as the first monitoring target or the first non-monitoring target based on the result of the determination. The controller 14 performs a second marking process on an image of every first monitoring target or an image of every first non-monitoring target to create a second exit image. The second marking process means image processing for making the image of the first monitoring target or the image of the first non-monitoring target distinguishable in the second exit image. The second marking process may for example be a process of reducing brightness of an image of every first non-monitoring target, a process of increasing brightness of an image of every first monitoring target, a process of adding a color to an image of every first monitoring target, or a process of outlining a contour of an image of every first monitoring target. An image including at least one of a second entry image and a second exit image may be referred to below as a second image. Examples of the second image including two images selected from the group consisting of a first entry image, a first exit image, a second entry image, and a second exit image include a second image including the second entry image and the second exit image, a second image including the second entry image and the first exit image, and a second image including the first entry image and the second exit image.

The storage 12 stores therein the first entry image, the first exit image, the user entry information, and the user exit information. Upon the controller 14 determining that the first entry image and the first exit image exhibit the same user, the storage 12 stores the first entry image and the first exit image exhibiting the same user in association with each other as an image set with respect to this specific user. The storage 12 stores the second entry image and the second exit image in association with the image set.

The image display section 18 displays the first entry image. The image display section 18 displays the first entry image or the second entry image that includes the image of the first monitoring target and the first exit image or the second exit image that includes the image of the same first monitoring target.

Figure 4:
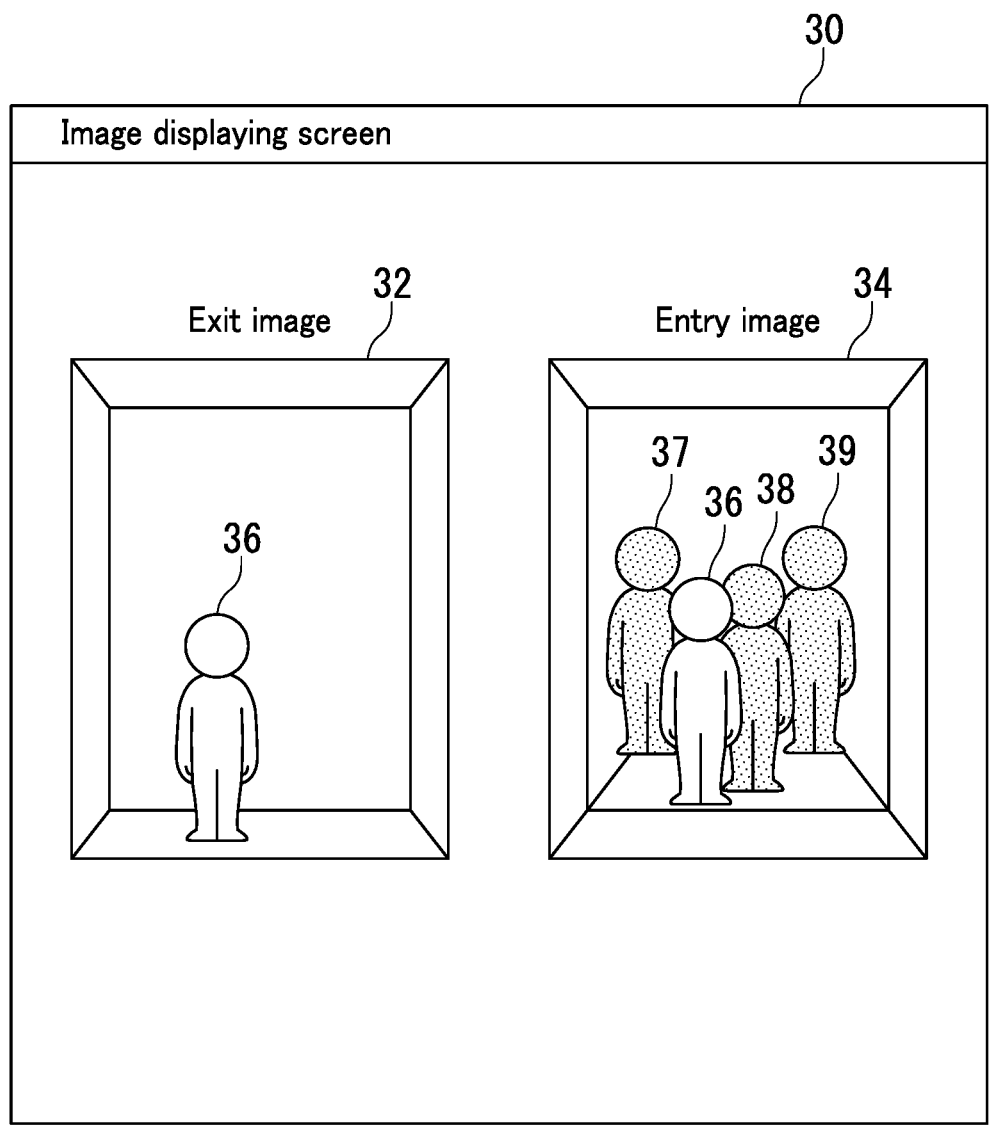
FIG. 4 is a diagram illustrating an example of an image displaying screen displayed on an image display section of the monitoring terminal device according to the first embodiment of the present invention.

The following describes an image displaying screen displayed on the image display section 18 of the monitoring terminal device 2 with reference to FIG. 4. FIG. 4 is a diagram illustrating an example of the image displaying screen displayed on the image display section 18 of the monitoring terminal device 2 according to the first embodiment. In FIG. 4, the first marking process has been performed, but the second marking process has not been performed. Both of the first marking process and the second marking process are a process of reducing brightness of an image of every first non-monitoring target.

An image displaying screen 30 includes an exit image 32 and an entry image 34. The entry image 34 includes images of users 36, 37, 38, and 39. The user 36 is a first monitoring target, and the users 37 to 39 are first non-monitoring targets. The entry image 34 includes the images of the first non-monitoring targets. In FIG. 4, the first marking process is a process of reducing brightness of the images of the first non-monitoring targets. Thus, the first marking process has been performed. The entry image 34 is therefore a second entry image created through the first marking process.

The exit image 32 includes an image of the user 36. The user 36 in the exit image 32 is the first monitoring target who is the same person as the user 36 in the entry image 34. The exit image 32 does not include any images of the first non-monitoring targets. In FIG. 4, the second marking process is a process of reducing brightness of the images of the first non-monitoring targets. Therefore, the second marking process has not been performed. That is, the exit image 32 is not subjected to the second marking process. The exit image 32 is not a second exit image created through the second marking process but a first exit image.

The entry image 34 exhibits the users 36 to 39 entering the specific area at the same time. The image of the user 36 included in the exit image 32 and the image of the user 36 included in the entry image 34 are images of the same person. The user 36, who is the first monitoring target to be under monitoring, is distinctly displayed as a result of the image processing of reducing brightness of the images of the other users 37 to 39. Thus, the monitoring terminal device 2 according to the first embodiment enables efficient monitoring of a plurality of users entering and exiting the specific area.

Figure 5:
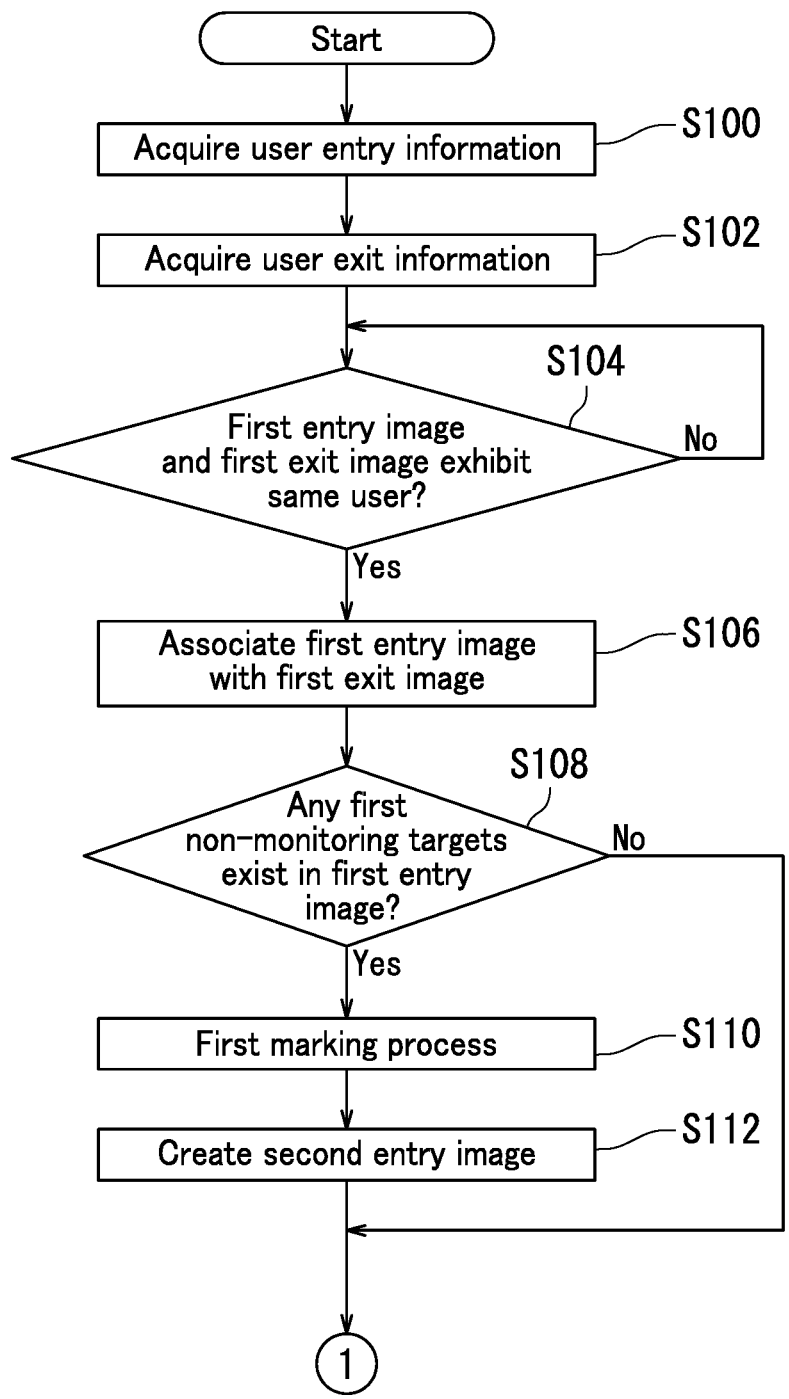
FIG. 5 is a flowchart illustrating a second image creation process according to the first embodiment of the present invention.
Figure 6:
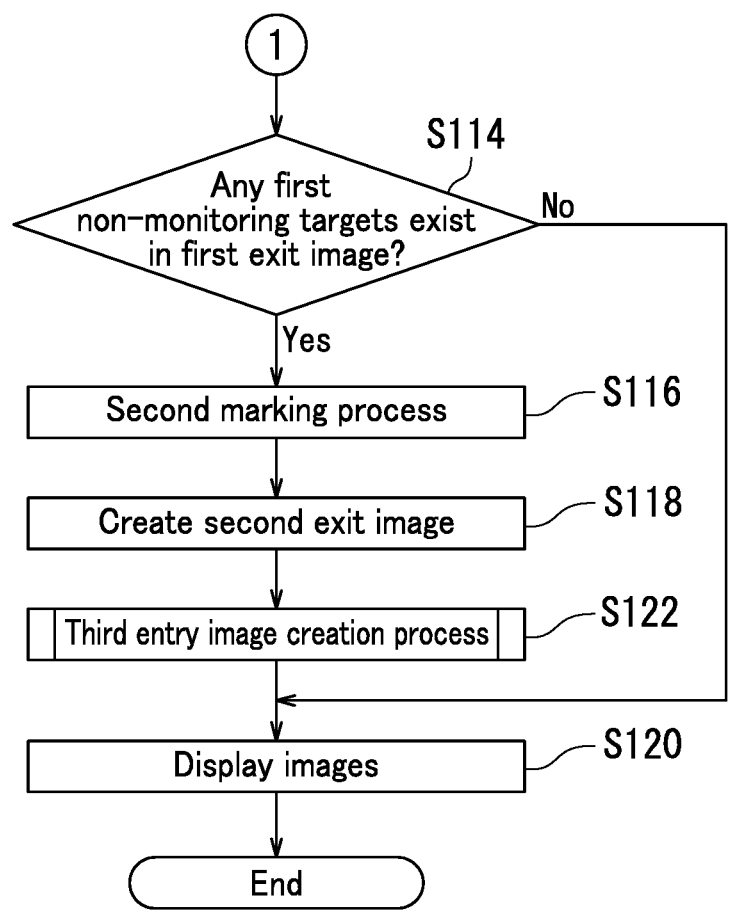
FIG. 6 is a flowchart illustrating the second image creation process according to the first embodiment of the present invention.

The following describes a second image creation process that is performed by the controller 14 of the monitoring terminal device 2 with reference to FIGS. 5 and 6. FIGS. 5 and 6 are flowcharts illustrating the second image creation process according to the first embodiment. In an example illustrated in FIGS. 5 and 6, the first marking process is performed, but the second marking process is not performed. Both of the first marking process and the second marking process are a process of reducing brightness of an image of every second non-monitoring target.

As illustrated in FIG. 5, the controller 14 acquires a first entry image through the reception section 10 and acquires the user entry information based on the first entry information (Step S100). The controller 14 acquires a first exit image through the reception section 10 and acquires the user exit information based on the first exit information (Step S102). The controller 14 determines whether or not the first entry image and the first exit image exhibit the same user based on the user entry information and the user exit information (Step S104). Specifically, the controller 14 determines whether or not the first exit image exhibits a user exhibited by the first entry image. The controller 14 performs Step S104 on one or more first exit images until a first exit image exhibiting the user exhibited by the first entry image is found (No in Step S104). Upon determining that the first entry image and the first exit image exhibit the same user (Yes in Step S104), the controller 14 associates the first entry image and the first exit image exhibiting the same user with each other and stores these images in the storage 12 as an image set with respect to this specific user (Step S106).

The controller 14 determines whether or not any first non-monitoring targets exist in the first entry image (Step S108). Specifically, the image display section 18 displays the first entry image. With respect to each of one or more users entering the specific area among users exhibited by the first entry image displayed on the image display section 18, the monitoring personnel determines whether or not to monitor the user by using the input section 16. Based on a result of the determination, the controller 14 specifies each of the users entering the specific area as a first monitoring target or a first non-monitoring target. In FIG. 5, the first marking process is a process of reducing brightness of an image of every first non-monitoring target in the first entry image. For this process, the controller 14 determines whether or not any first non-monitoring targets exist in the first entry image after each user has been specified as the first monitoring target or the first non-monitoring target. Upon determining that no first non-monitoring target exists in the first entry image (No in Step S108), the controller 14 proceeds to Step S114 described below without performing the first marking process. Upon determining that one or more first non-monitoring targets exist in the first entry image (Yes in Step S108), the controller 14 performs the first marking process on images of the first non-monitoring targets in the first entry image (Step S110) to create a second entry image (Step S112).

As illustrated in FIG. 6, the controller 14 determines whether or not any first non-monitoring targets exist in the first exit image (Step S114). Specifically, the controller 14 acquires a first exit image associated with the first entry image subjected to the first marking process as part of an image set with respect to the first monitoring target. The controller 14 then specifies each of one or more users exhibited by the first exit image as the first monitoring target or the first non-monitoring target. In FIG. 6, the second marking process is a process of reducing brightness of an image of every first non-monitoring target in the first exit image. For this process, the controller 14 determines whether or not any first non-monitoring targets exist in the first exit image. Upon determining that no first non-monitoring target exists in the first exit image (No in Step S114), the controller 14 proceeds to Step S120 described below without performing the second marking process. Upon determining that one or more first non-monitoring targets exist in the first exit image (Yes in Step S114), the controller 14 performs the second marking process on the images of the first non-monitoring targets in the first exit image (Step S116) to create a second exit image (Step S118).

The controller 14 displays, on the image display section 18, the first entry image or the second entry image that includes the image of the first monitoring target and the first exit image or the second exit image that includes the image of the same first monitoring target (Step S120). Specifically, upon performing the first marking process, the controller 14 displays the second entry image on the image display section 18. Likewise, upon performing the second marking process, the controller 14 displays the second exit image on the image display section 18. At least one user enters the specific area and at least one user exits the specific area, and either or both of the at least one user entering the specific area and the at least one user exiting the specific area is a plurality of users. Accordingly, the second image to be displayed on the image display section 18 by the controller 14 in Step S122 is any of a second image including the first entry image and the second exit image, a second image including the second entry image and the first exit image, and a second image including the second entry image and the second exit image.

Through the above, the first embodiment has been described. The monitoring terminal device 2 according to the first embodiment displays a second image created by performing either or both of the first marking process and the second marking process. Thus, the monitoring terminal device 2 enables efficient monitoring even in a situation in which a plurality of users enter and exit the specific area.

The description is given with reference to FIGS. 4 to 6 using an example in which the first marking process is a process of reducing brightness of an image of every first non-monitoring target in a first entry image, and the second marking process is a process of reducing brightness of an image of every first non-monitoring target in a first exit image. In such an example, the controller 14 determines whether or not any first non-monitoring targets exist in the first entry image and the first exit image after specifying each user as a first monitoring target or a first non-monitoring target (Step S108, Step S114). Upon determining that one or more first non-monitoring targets exist (Yes in Step S108, Yes in Step S114), the controller 14 performs the first marking process on the first entry image (Step S110) and performs the second marking process on the first exit image (Step S118). In another example in which the first marking process and the second marking process are image processing that is performed on an image of a first monitoring target, the first monitoring target surely exists in the image set with respect to the first monitoring target. The controller 14 therefore performs the first marking process on the image of the first monitoring target in the first entry image and performs the second marking process on the image of the first monitoring target in the first exit image.

The first embodiment has been described using an example in which a single gate functions both as the entrance gate and as the exit gate of the specific area. Alternatively, the entrance gate and the exit gate of the specific area may be different gates. Alternatively, the specific area may have either both of a plurality of gates as the entrance gate and a plurality of gates as the exit gate. A third entry image creation process (Step S122) in FIG. 6 is optional, which is described in a second embodiment below.

Second Embodiment

The following describes the monitoring terminal device 2 according to the second embodiment with reference to FIGS. 3, 5, 6, 7, and 8. The second embodiment differs from the first embodiment in that the second embodiment further has the third entry image creation process. The following describes the second embodiment based on differences compared to the first embodiment and omits description of matter that is the same as for the first embodiment.

In the case of the second embodiment, one or more first non-monitoring targets exit the specific area concurrently with a first monitoring target. Besides, at least one of the first non-monitoring targets exiting the specific area concurrently with the first monitoring target did not enter the specific area concurrently with the first monitoring target. That is, a plurality of users exit the specific area at the same time, and at least one of the users is a first non-monitoring target who did not enter the specific area concurrently with the first monitoring target.

The controller 14 illustrated in FIG. 3 acquires a first entry image associated with a first exit image subjected to the second marking process as part of an image set with respect to a first non-monitoring target and determines whether or not to perform a third marking process on an image of every first non-monitoring target in the first entry image. Upon determining to perform the third marking process, the controller 14 performs the third marking process on the image of the first non-monitoring target in the first entry image to create a third entry image. The image display section 18 further displays the third entry image. The third marking process may for example be a process of reducing brightness of an image of every first non-monitoring target, a process of adding a color to an image of every first non-monitoring target, or a process of outlining a contour of an image of every first non-monitoring target. Preferably, the third marking process is the same image processing as the first marking process and the second marking process. This is because such settings make it easy to understand correspondence between images subjected to the third marking process, images subjected to the first marking process, and images subjected to the second marking process.

Figure 7:
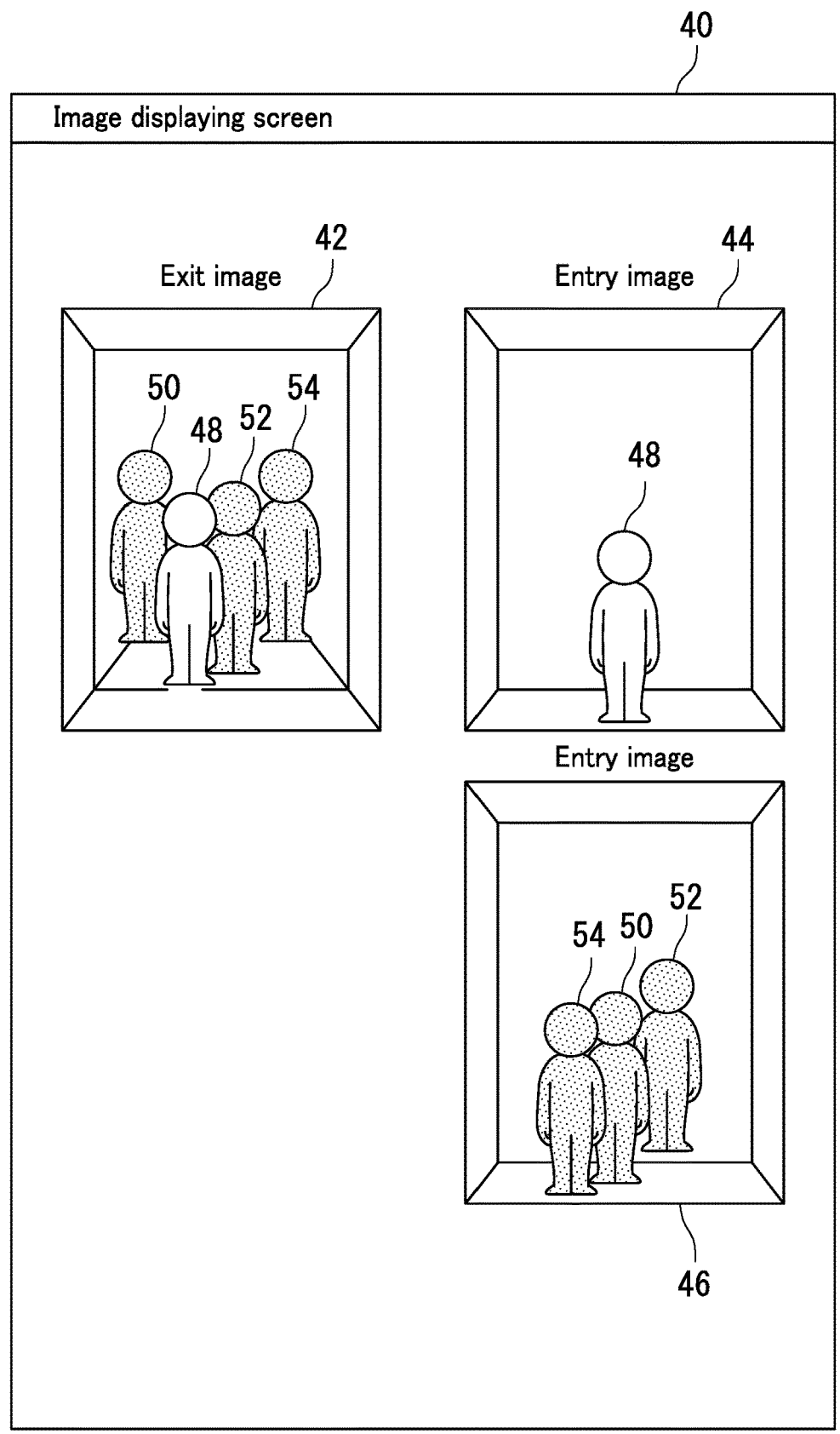
FIG. 7 is a diagram illustrating an example of an image displaying screen displayed on an image display section of a monitoring terminal device according to a second embodiment of the present invention.

FIG. 7 is a diagram illustrating an example of a screen displayed on the image display section 18 of the monitoring terminal device 2 according to the second embodiment. In FIG. 7, the first marking process has not been performed. The second marking process and the third marking process have been performed. The third marking process is a process of reducing brightness of an image of every first non-monitoring target, which is the same process as the first marking process and the second marking process described for the first embodiment.

An image displaying screen 40 includes an exit image 42, an entry image 44, and an entry image 46. The exit image 42 includes images of users 48, 50, 52, and 54. The user 48 is a first monitoring target, and the users 50, 52, and 54 are first non-monitoring targets. The exit image 42 includes the first non-monitoring targets. As already described for the first embodiment, the second marking process is a process of reducing brightness of an image of every first non-monitoring target. Therefore, the second marking process has been performed. The exit image 42 is therefore a second exit image created through the second marking process.

The entry image 44 includes an image of the user 48. The user 48 in the entry image 44 is the first monitoring target who is the same person as the user 48 in the exit image 42. The entry image 44 does not include any images of the first non-monitoring targets. As already described for the first embodiment, the first marking process is a process of reducing brightness of an image of every first non-monitoring target. Therefore, the first marking process has not been performed. That is, the entry image 44 is not subjected to the first marking process. The entry image 44 is not a second entry image created through the first marking process but a first entry image.

The entry image 46 includes images of the users 50, 52, and 54. The users 50, 52, and 54 in the entry image 46 are the first non-monitoring targets who are respectively the same people as the users 50, 52, and 54 in the exit image 42. The entry image 46 only includes the first non-monitoring targets and does not include the first monitoring target. As already described, the third marking process set herein is a process of reducing brightness of an image of every first non-monitoring target. Therefore, the third marking process has been performed. That is, the entry image 46 is subjected to the third marking process. The entry image 46 is a third entry image created through the third marking process.

Figure 8:
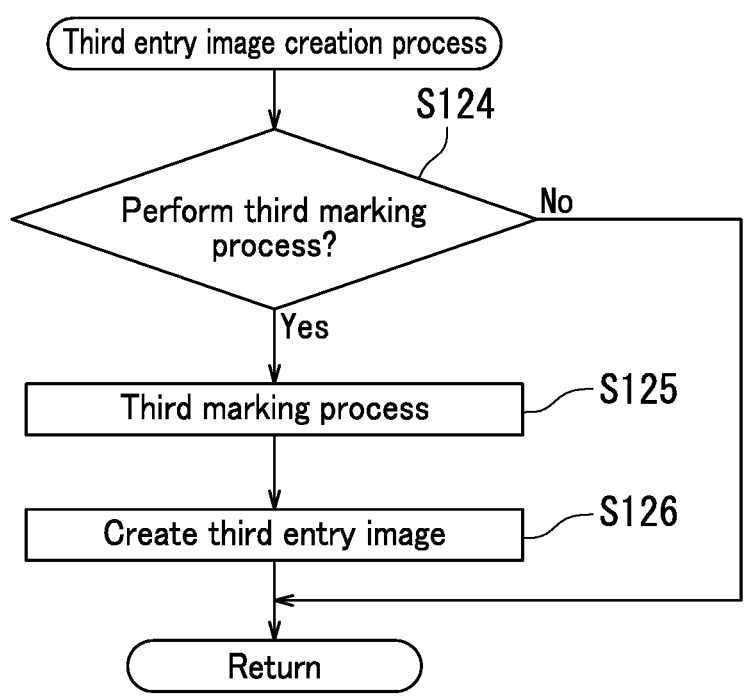
FIG. 8 is a flowchart illustrating a third entry image creation process according to the second embodiment of the present invention.

The following describes the third entry image creation process with reference to FIGS. 5, 6, and 8. FIG. 8 is a flowchart illustrating the third entry image creation process according to the second embodiment. The third entry image creation process shown in FIG. 6 is optional.

In the second embodiment, as in the first embodiment, the second image creation process is performed first as illustrated in FIGS. 5 and 6 (Steps S100 to S118).

Next, the third entry image creation process is performed (Step S122). Specifically, as illustrated in FIG. 8, the controller 14 acquires a first entry image associated with a first exit image subjected to the second marking process as part of an image set with respect to a first non-monitoring target and determines whether or not to perform the third marking process on an image of every first non-monitoring target in the first entry image (Step S124). Upon determining not to perform the third marking process (No in Step S124), the controller 14 ends the third entry image creation process. Upon determining to perform the third marking process (Yes in Step S124), the controller 14 performs the third marking process on the image of the first non-monitoring target (Step S125) to create a third entry image (Step S126). The controller 14 displays the third entry image on the image display section 18 in addition to the second image (Step S120).

Whether or not to perform the third marking process in Step S122 depends on whether a target of the third marking process is an image of every first monitoring target or an image of every first non-monitoring target. In FIGS. 5 to 8, the third marking process is a process of reducing brightness of the images of the first non-monitoring targets in each first exit image. The first entry image that includes the images of the first non-monitoring targets is a target of the third marking process, and therefore the third marking process is performed thereon.

The monitoring terminal device 2 according to the second embodiment displays not only a second image including the images exhibiting the first monitoring target but also the third entry image including the images of the first non-monitoring targets on the image display section. Thus, the monitoring terminal device 2 according to the second embodiment enables efficient monitoring of users even in a situation in which the number of users entering the specific area differs from the number of users exiting the specific area.

Third Embodiment

Figure 9:
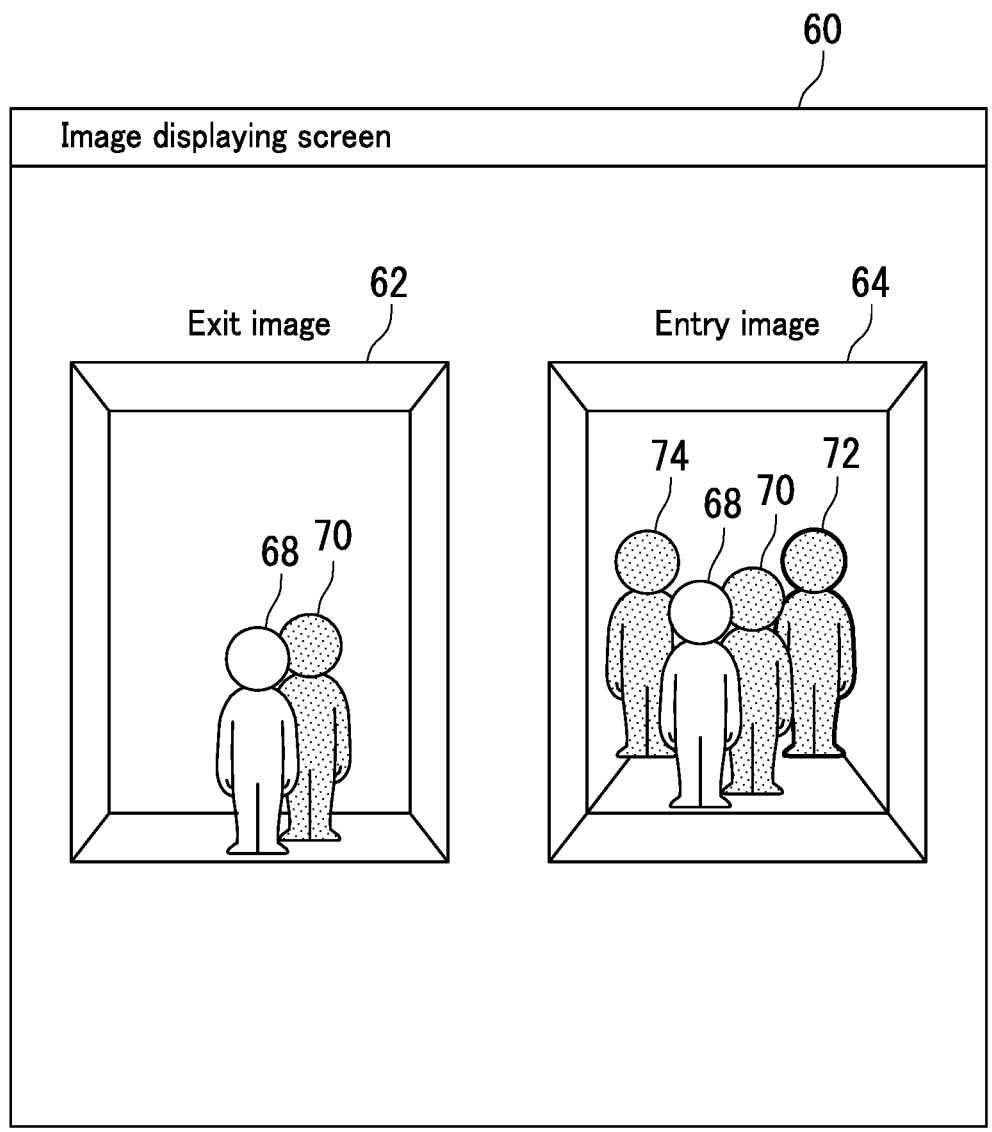
FIG. 9 is a diagram illustrating an example of a screen displayed on an image display section of a monitoring terminal device according to a third embodiment of the present invention.

The following describes the monitoring terminal device 2 according to a third embodiment with reference to FIGS. 3, 9, 10, 11, and 12. The third embodiment differs from the first embodiment in that the third embodiment has a fourth entry image creation process. The following describes the third embodiment based on differences compared to the first embodiment and omits description of matter that is the same as for the first embodiment. In FIG. 9, the first marking process, the second marking process, and a fourth marking process have been performed. The fourth marking process is a process of outlining a contour of an image of a first non-monitoring target. The fourth marking process is a different process from the first marking process and the second marking process described for the first embodiment. FIG. 9 shows a second monitoring target defined as a first non-monitoring target who exited the specific area before a first exit time.

The user entry information includes a time of entry into the specific area and a gate used for entry. The user exit information includes a time of exit from the specific area and a gate used for exit. The storage 12 illustrated in FIG. 3 stores the user entry information and the user exit information in association with a corresponding image set. Based on the user exit information and a second entry image, the controller 14 specifies a second non-monitoring target using the first exit time at which a first monitoring target exited the specific area as a reference. The second non-monitoring target is a user who exited the specific area before the first exit time, a user who exited the specific area at the first exit time, or a user who exited the specific area after the first exit time. The controller 14 performs the fourth marking process on an image of the second non-monitoring target in the second entry image to create a fourth entry image. The image display section 18 further displays the fourth entry image.

The fourth marking process means image processing for mainly making the second non-monitoring target distinguishable from any other first non-monitoring targets who are not second non-monitoring targets in the fourth entry image. The fourth marking process may for example be a process of reducing brightness of the image of the second non-monitoring target, a process of adding a color to the image of the second non-monitoring target, or a process of outlining a contour of the image of the second non-monitoring target. Note that the fourth marking process is performed on an image so as to maintain a state of the image made distinguishable by previously performed image processing. It is therefore preferable to perform the fourth marking process as for example a different type of image processing from the first marking process.

FIG. 9 is a diagram illustrating an example of a screen displayed on the image display section of the monitoring terminal device 2 according to the third embodiment. An image displaying screen 60 includes an exit image 62 and an entry image 64. The exit image 62 includes images of users 68 and 70. The user 68 is a first monitoring target, and the user 70 is a first non-monitoring target. The exit image 62 includes an image of the first non-monitoring target. In FIG. 9, the second marking process is a process of reducing brightness of the image of the first non-monitoring target. Therefore, the second marking process has been performed. The exit image 62 is therefore a second exit image created through the second marking process.

The entry image 64 includes images of users 68, 70, 72, and 74. The user 68 is a first monitoring target, and the users 70, 72, and 74 are first non-monitoring targets. The entry image 64 includes the images of the first non-monitoring targets. In FIG. 9, the first marking process is a process of reducing brightness of the images of the first non-monitoring targets. Therefore, the first marking process has been performed. The entry image 64 is therefore a second entry image created through the first marking process.

The users 68 and 70 in the entry image 64 are respectively the same people as the users 68 and 70 in the exit image 62. That is, the user 70 is the first non-monitoring target who exited the specific area concurrently with the user 68 according to a reference time at which the user 68 exited the specific area (the first exit time). The users 72 and 74 in the entry image 64 are not exhibited by the exit image 62. That is, the users 72 and 74 did not exit the specific area concurrently with the user 68. The user 74 exited the specific area after the first exit time of the user 68. The user 72 exited the specific area before the first exit time of the user 68. In FIG. 9, the second non-monitoring target is defined as a first non-monitoring target who exited the specific area before the first exit time of the first monitoring target. The fourth marking process is a process of outlining a contour of an image of every second non-monitoring target. Accordingly, the user 72 is the second non-monitoring target, and the fourth marking process is performed on the image of the second monitoring target in the second entry image. The entry image 64 is therefore a fourth entry image created by performing the fourth marking process on the second entry image.

The example in which the second non-monitoring target is defined as a user who exited the specific area before the first exit time has been described with reference to FIG. 9. Alternatively, the second non-monitoring target may be defined as a user who exited the specific area at the first exit time or a user who exited the specific area after the first exit time. In the former case, the user 70 in the entry image 64 is a second non-monitoring target, and the fourth marking process is performed on the image of the user 70. In the latter case, the user 74 in the entry image 64 is a second non-monitoring target, and the fourth marking process is performed on the image of the user 74.

Figure 10:
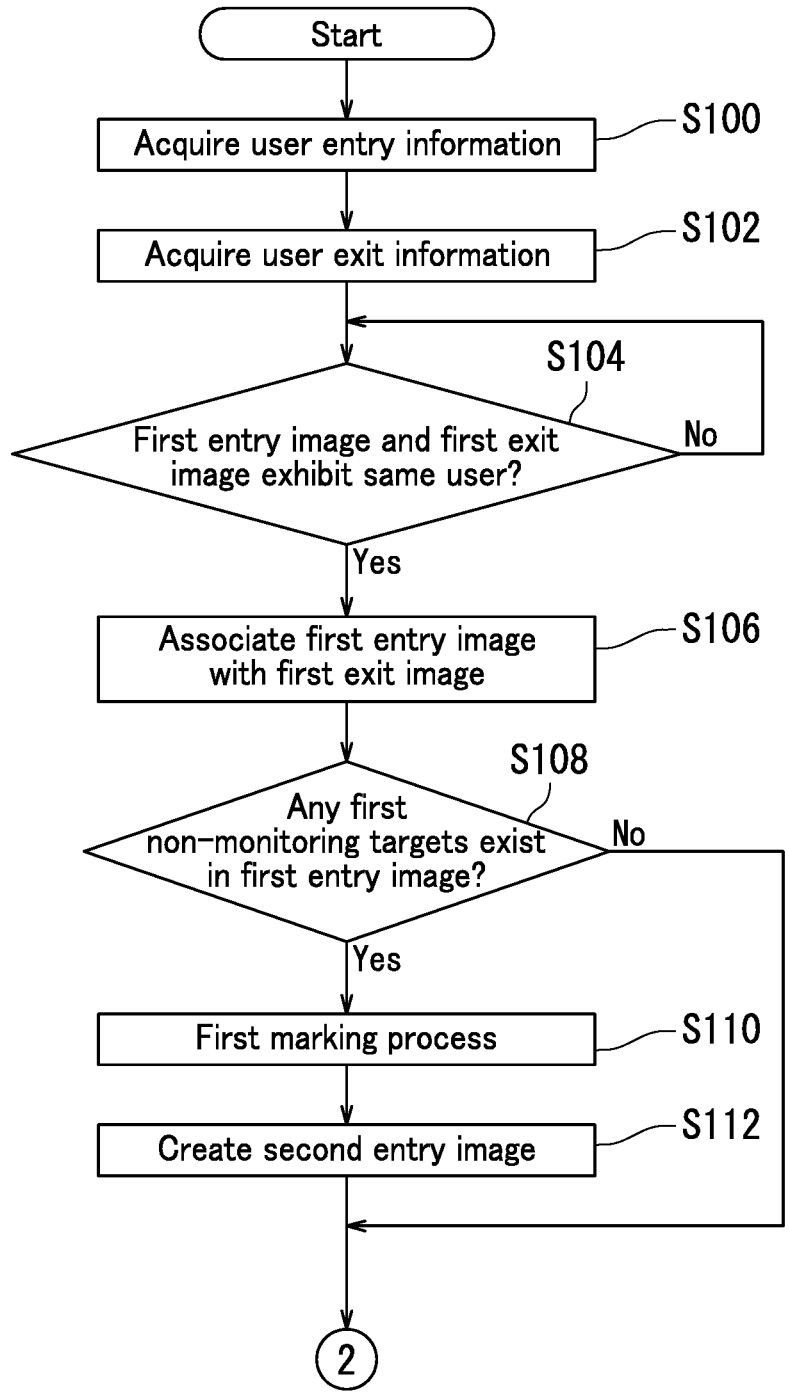
FIG. 10 is a flowchart illustrating a fourth entry image creation process according to the third embodiment of the present invention.
Figure 11:
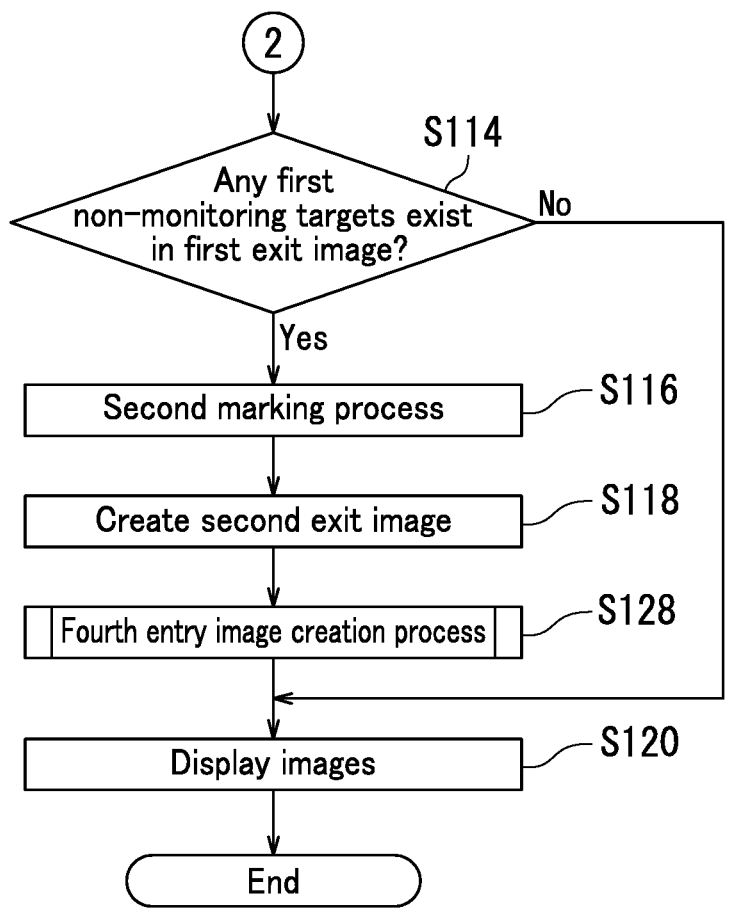
FIG. 11 is a flowchart illustrating the fourth entry image creation process according to the third embodiment of the present invention.
Figure 12:
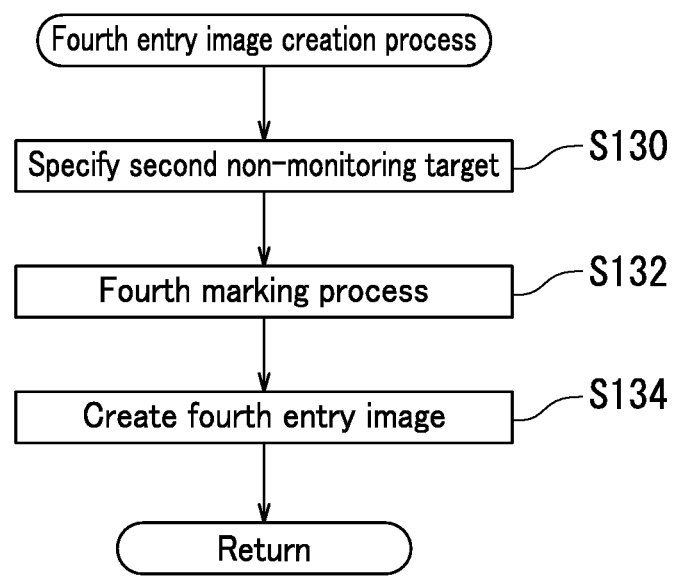
FIG. 12 is a flowchart illustrating the fourth entry image creation process according to the third embodiment of the present invention.

The following describes the fourth entry image creation process that is performed by the controller 14 of the monitoring terminal device 2 with reference to FIGS. 10 to 12. FIGS. 10 to 12 are flowcharts illustrating the fourth image creation process according to the third embodiment.

In the third embodiment, as in the first embodiment, the second image creation process is performed first as illustrated in FIGS. 10 and 11 (Steps S100 to S118).

Next, the fourth entry image creation process is performed (Step S128). Specifically, based on the user exit information and a second entry image, the controller 14 specifies a second non-monitoring target using a first exit time at which a first monitoring target exited the specific area as a reference (Step S130) as illustrated in FIG. 11. The monitoring personnel can determine the definition of the second non-monitoring target based on a temporal relationship of an exit time of each first non-monitoring target with the first exit time as described above. The controller 14 performs the fourth marking process on an image of the second non-monitoring target in the second entry image (Step S132) to create a fourth entry image (Step S134). The controller 14 displays the fourth entry image on the image display section 18 in addition to the first entry image or the second entry image and the first exit image or the second exit image (Step S120).

The monitoring terminal device 2 according to the third embodiment displays not only the first entry image or the second entry image that includes the image of the first monitoring target but also the fourth entry image exhibiting the first non-monitoring target who entered the specific area concurrently with the first monitoring target on the image display section 18. Thus, the monitoring terminal device 2 according to the third embodiment enables efficient monitoring of a user suspected to have a relationship with the first monitoring target.

Fourth Embodiment

Figure 13:
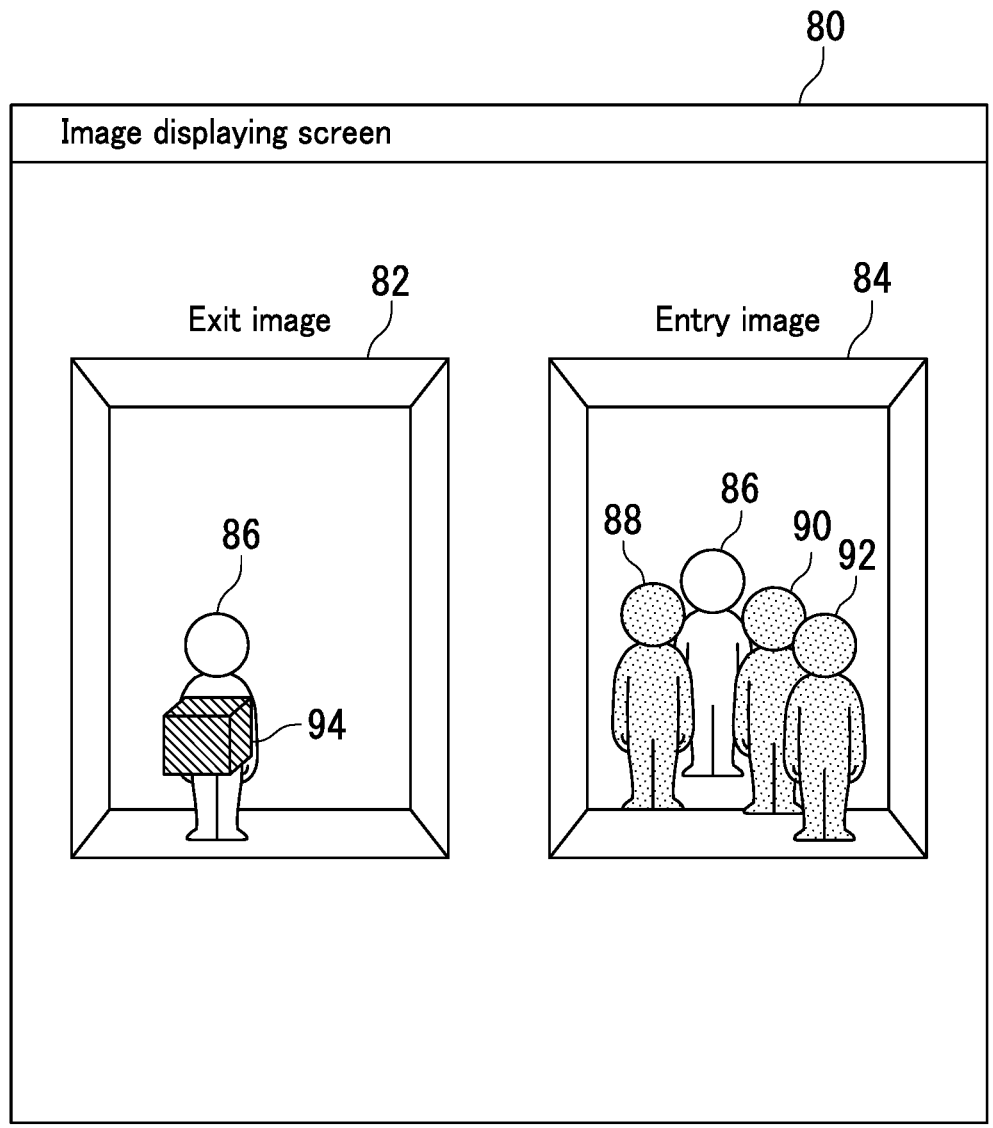
FIG. 13 is a diagram illustrating an example of a screen displayed on an image display section of a monitoring terminal device according to a fourth embodiment of the present invention.

The following describes the monitoring terminal device 2 according to a fourth embodiment with reference to FIGS. 3, 13, 14, 15, and 16. The fourth embodiment differs from the first embodiment in that the fourth embodiment further has a first difference determination process. The following describes the fourth embodiment based on differences compared to the first embodiment and omits description of matter that is the same as for the first embodiment. In FIG. 13, the first marking process has not been performed. The second marking process and a fifth marking process have been performed. The fifth marking process is a process of adding a color to an image of a first difference. The fifth marking process is a different process from the first marking process and the second marking process described for the first embodiment.

The controller 14 compares a first entry state of a first monitoring target at a time of entry into the specific area and a first exit state of the first monitoring target at a time of exit from the specific area based on the user entry information and the user exit information of the first monitoring target to determine whether or not there is a first difference between the first entry state and the first exit state.

The first difference is a difference in the appearance that can be visually confirmed, such as what the first monitoring target is wearing (specific examples include clothes, shoes, glasses, watch, cap, and mask) and belongings (specific examples include document, package, and cane). The first entry state is indicated by the user entry information of the first monitoring target. The first exit state is indicated by the user exit information of the first monitoring target.

Upon determining that there is a first difference, the controller 14 performs the fifth marking process on an image of the first difference in the first entry image or the second entry image to create a fifth entry image, or performs the fifth marking process on an image of the first difference in the first exit image or the second exit image to create a third exit image.

The fifth marking process is image processing for making the presence of the first difference distinguishable in an image of the first monitoring target in comparison between an exit image and an entry image. The fifth marking process may for example be a process of increasing brightness of the image of the first difference, a process of adding a color to the image of the first difference, or a process of outlining a contour of the image of the first difference. Note that the fifth marking process is performed on an image so as to maintain a state of the image made distinguishable by previously performed image processing.

The image display section 18 further displays the fifth entry image or the third exit image.

FIG. 13 is a diagram illustrating an example of a screen displayed on the image display section of the monitoring terminal device 2 according to the fourth embodiment. An image displaying screen 80 includes an entry image 84 and an exit image 82. The entry image 84 includes images of users 86, 88, 90, and 92. The user 86 is a first monitoring target. The users 88, 90, and 92 are first non-monitoring targets. The entry image 84 includes the images of the first non-monitoring targets. In FIG. 13, the first marking process is a process of reducing brightness of the images of the first non-monitoring targets. That is, the first marking process has been performed. The entry image 84 is therefore a second entry image created through the first marking process.

The exit image 82 includes an image of the user 86. The user 86 is holding a box 94. The user 86 in the exit image 82 is the same person as the user 86 in the entry image 84. The user 86 is the first monitoring target. The entry image 84 does not include any images of the first non-monitoring targets. The second marking process is a process of reducing brightness of an image of every first non-monitoring target. Accordingly, the second marking process is not performed, and a second exit image is not created.

Comparing a first entry state of the user 86 exhibited by the entry image 84 and a first exit state of the user 86 exhibited by the exit image 82 reveals that the exit image 82 differs from the entry image 84 in that the user 86 exhibited by the exit image 82 is holding the box 94. That is, there is the box 94 as a first difference in the exit image 82. In FIG. 13, the fifth marking process is a process of adding a color to the image of the first difference. The exit image 82 is a third exit image created by performing the fifth marking process on the first exit image.

Figure 14:
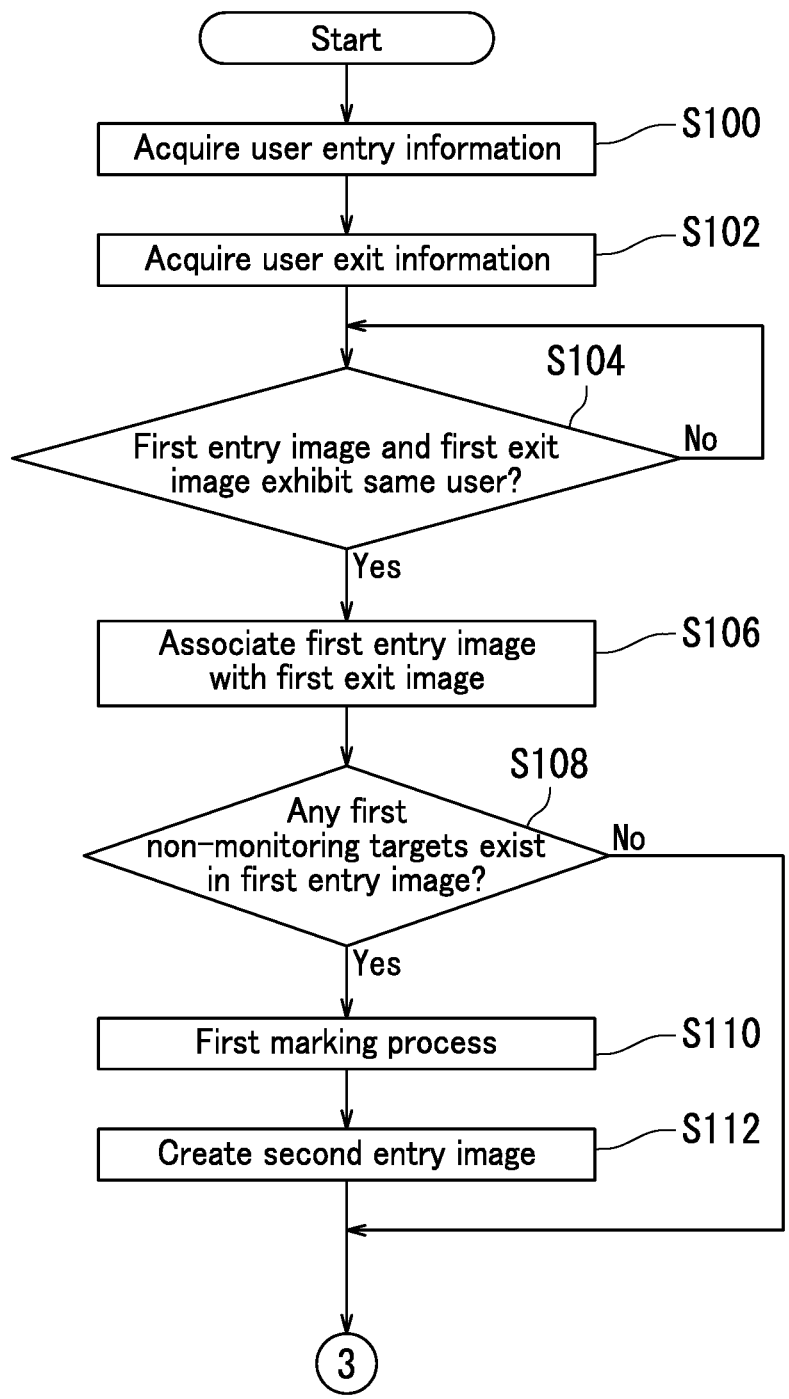
FIG. 14 is a flowchart illustrating a first difference determination process according to the fourth embodiment of the present invention.
Figure 15:
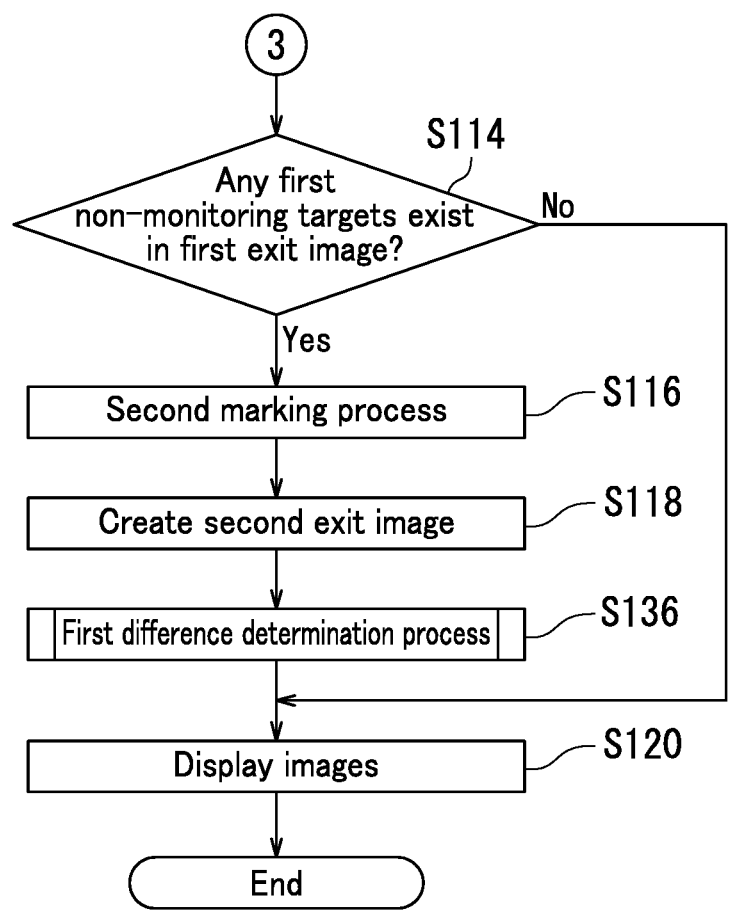
FIG. 15 is a flowchart illustrating the first difference determination process according to the fourth embodiment of the present invention.
Figure 16:
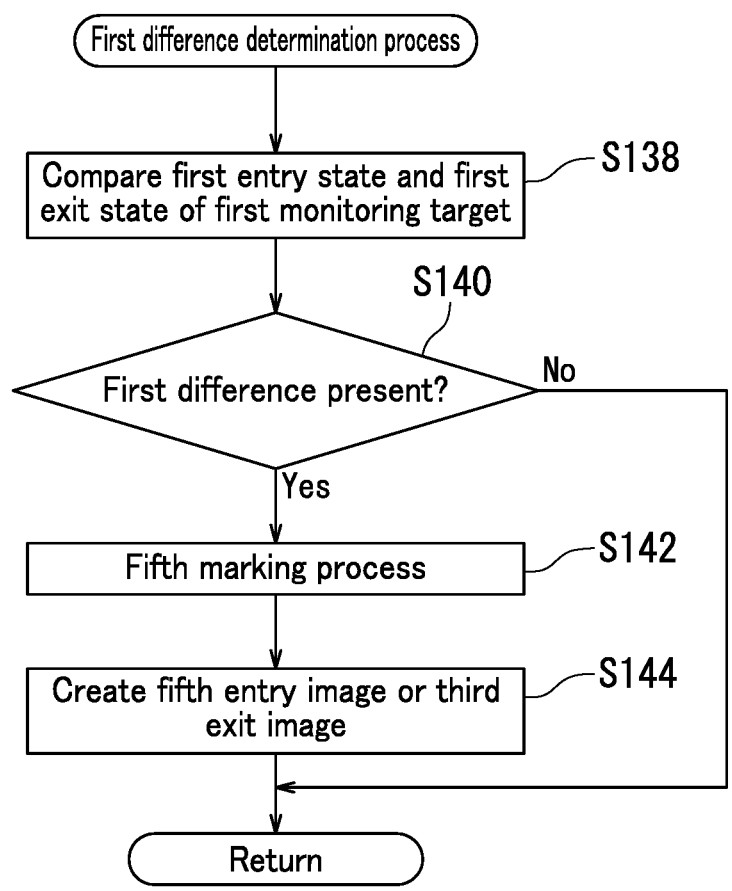
FIG. 16 is a flowchart illustrating the first difference determination process according to the fourth embodiment of the present invention.

The following describes the first difference determination process with reference to FIGS. 14 to 16. FIGS. 14 to 16 are flowcharts illustrating the first difference determination process according to the fourth embodiment.

In the fourth embodiment, as in the first embodiment, the second image creation process is performed first as illustrated in FIGS. 14 and 15 (Steps S100 to S118).

Next, the first difference determination process is performed (Step S136). Specifically, as illustrated in FIG. 16, the controller 14 compares a first entry state and a first exit state of a first monitoring target (Step S138). The controller 14 determines whether or not there is a first difference between the first entry state and the first exit state (Step S140). Upon determining that there is no first difference (No in Step S140), the controller 14 ends the first difference determination process. Upon determining that there is a first difference (Yes in Step S140), the controller 14 performs the fifth marking process on an image of the first difference in the first entry image or the second entry image (Step S142) to create a fifth entry image (Step S144). Alternatively, the controller 14 performs the fifth marking process on an image of the first difference in the first exit image or the second exit image (Step S142) to create a third exit image (Step S144). The fifth marking process is performed on an entry image (first entry image or second entry image) having the first difference or an exit image (first exit image or second exit image) having the first difference.

The controller 14 further displays the fifth entry image or the third exit image on the image display section 18.

Note that the present embodiment has been described with reference to FIGS. 13 to 16 using the example in which the fifth marking process is performed on a first entry image, a second entry image, a first exit image, or a second exit image. The fifth marking process may alternatively be performed on a fourth entry image.

The monitoring terminal device 2 according to the fourth embodiment displays, on the image display section, the fifth entry image or the third exit image that includes the image of the first difference between the first entry state and the first exit state of the first monitoring target. Thus, the monitoring terminal device 2 according to the fourth embodiment enables easy recognition of a difference in the state of the first monitoring target between entry and exit of the first monitoring target, and thus enables efficient monitoring of the first monitoring target even in a situation in which a plurality of users enter and exit the specific area.

Fifth Embodiment

Figure 17:
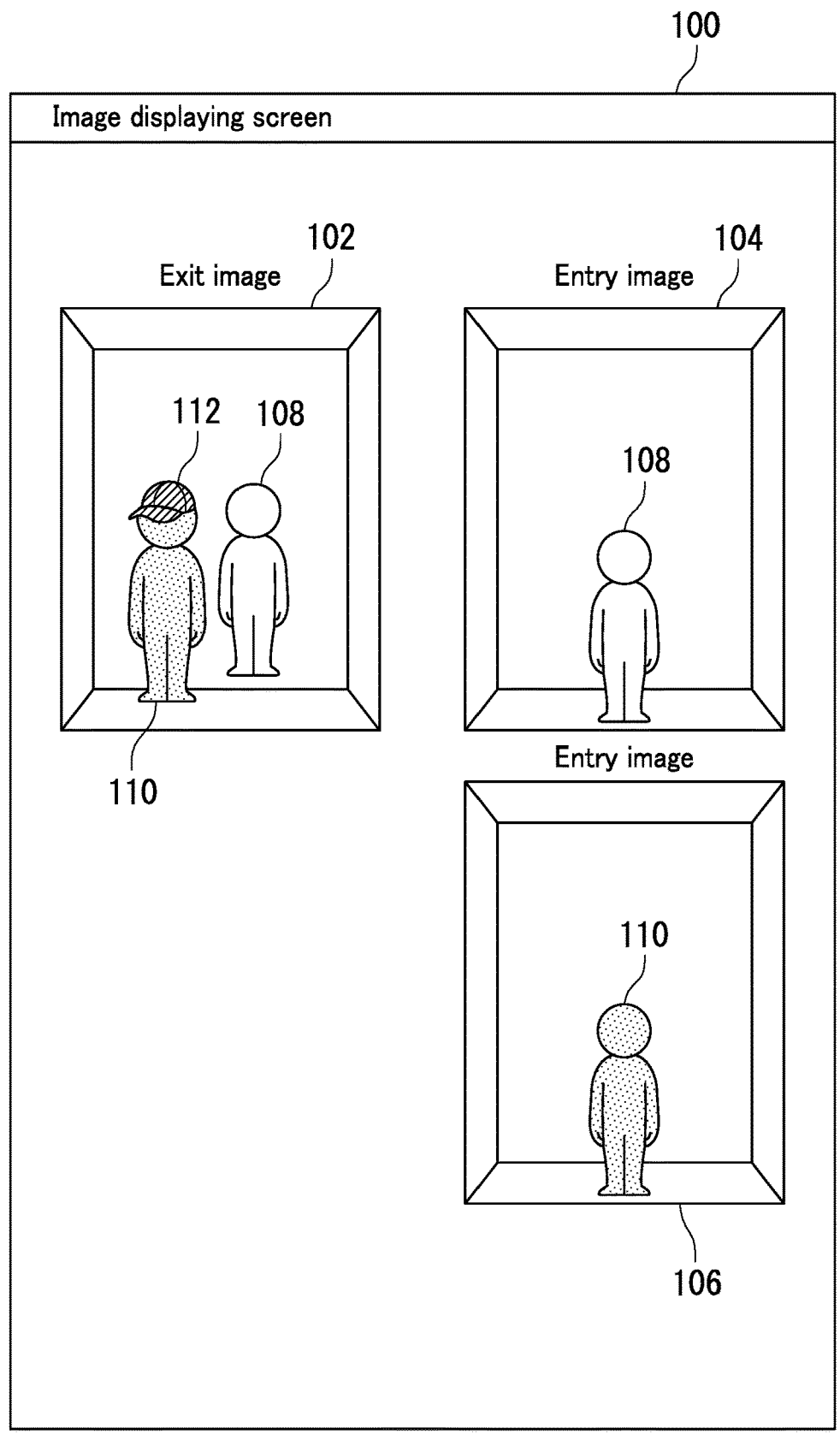
FIG. 17 is a diagram illustrating an example of a screen displayed on an image display section of a monitoring terminal device according to a fifth embodiment of the present invention.

The following describes the monitoring terminal device 2 according to a fifth embodiment with reference to FIGS. 3, 17, 18, 19, and 20. The fifth embodiment differs from the first embodiment in that the fifth embodiment further has a second difference determination process. The following describes the second embodiment based on differences compared to the first embodiment and omits description of matter that is the same as for the first embodiment. In FIG. 17, the first marking process has not been performed. The second marking process, the third marking process, and a sixth marking process have been performed. The third marking process is a process of reducing brightness of an image of every first non-monitoring target. The sixth marking process is a process of adding a color to an image of a second difference. The sixth marking process is a different process from the first marking process and the second marking process described for the first embodiment.

A first non-monitoring target exiting the specific area concurrently with a first monitoring target is a third non-monitoring target.

The controller 14 compares a second entry state of the third non-monitoring target at a time of entry into the specific area and a second exit state of the third non-monitoring target at a time of exit from the specific area based on the user entry information and the user exit information of the third non-monitoring target. The controller 14 determines whether or not there is a second difference between the second entry state and the second exit state.

The second difference is a difference in the appearance that can be visually confirmed, such as what the third non-monitoring target is wearing (specific examples include clothes, shoes, glasses, watch, cap, and mask) and belongings (specific examples include document, package, and cane). The second entry state is indicated by the user entry information of the third non-monitoring target. The second exit state is indicated by the user exit information of the third non-monitoring target.

Upon determining that there is a second difference, the controller 14 performs the sixth marking process on an image of the second difference in the second entry image to create a sixth entry image. Alternatively, upon determining that there is a second difference, the controller 14 performs the sixth marking process on an image of the second difference in the second exit image to create a fourth exit image.

The sixth marking process is image processing for making the presence of the second difference distinguishable in an image of the third non-monitoring target in comparison between an exit image and an entry image. The sixth marking process may for example be a process of increasing brightness of the image of the second difference, a process of adding a color to the image of the second difference, or a process of outlining a contour of the image of the second difference. Note that the sixth marking process is performed on an image so as to maintain a state of the image made distinguishable by previously performed image processing.

The image display section further displays the sixth entry image or the fourth exit image.

FIG. 17 is a diagram illustrating an example of a screen displayed on the image display section of the monitoring terminal device 2 according to the fifth embodiment. An image displaying screen 100 includes an exit image 102, an entry image 104, and an entry image 106. The entry image 104 includes an image of a user 108. The user 108 is a first monitoring target. The entry image 104 does not include any images of first non-monitoring targets. Therefore, the first marking process has not been performed. That is, the entry image 104 is a first entry image.

The entry image 106 includes an image of a user 110. The user 110 is a first non-monitoring target. The entry image 106 includes the image of the first non-monitoring target. The third marking process is a process of reducing brightness of an image of every first non-monitoring target. Therefore, the third marking process has been performed. The entry image 106 is therefore a third entry image created through the first marking process.

The exit image 102 includes images of the users 108 and 110. The user 108 in the exit image 102 is the first monitoring target who is the same person as the user 108 in the entry image 104. The user 110 in the exit image 102 is the first non-monitoring target who is the same person as the user 110 in the entry image 106. Comparing a second entry state of the user 110 exhibited by the entry image 106 and a second exit state of the user 110 exhibited by the exit image 102 reveals that the exit image 102 differs from the entry image 106 in that the user 110 exhibited by the exit image 102 is wearing a cap 112. That is, there is the cap 112 as a second difference in the exit image 102. In FIG. 17, the sixth marking process is a process of adding a color to an image of the second difference. The exit image 102 is a fourth exit image created by performing the sixth marking process on the second exit image.

Figure 18:
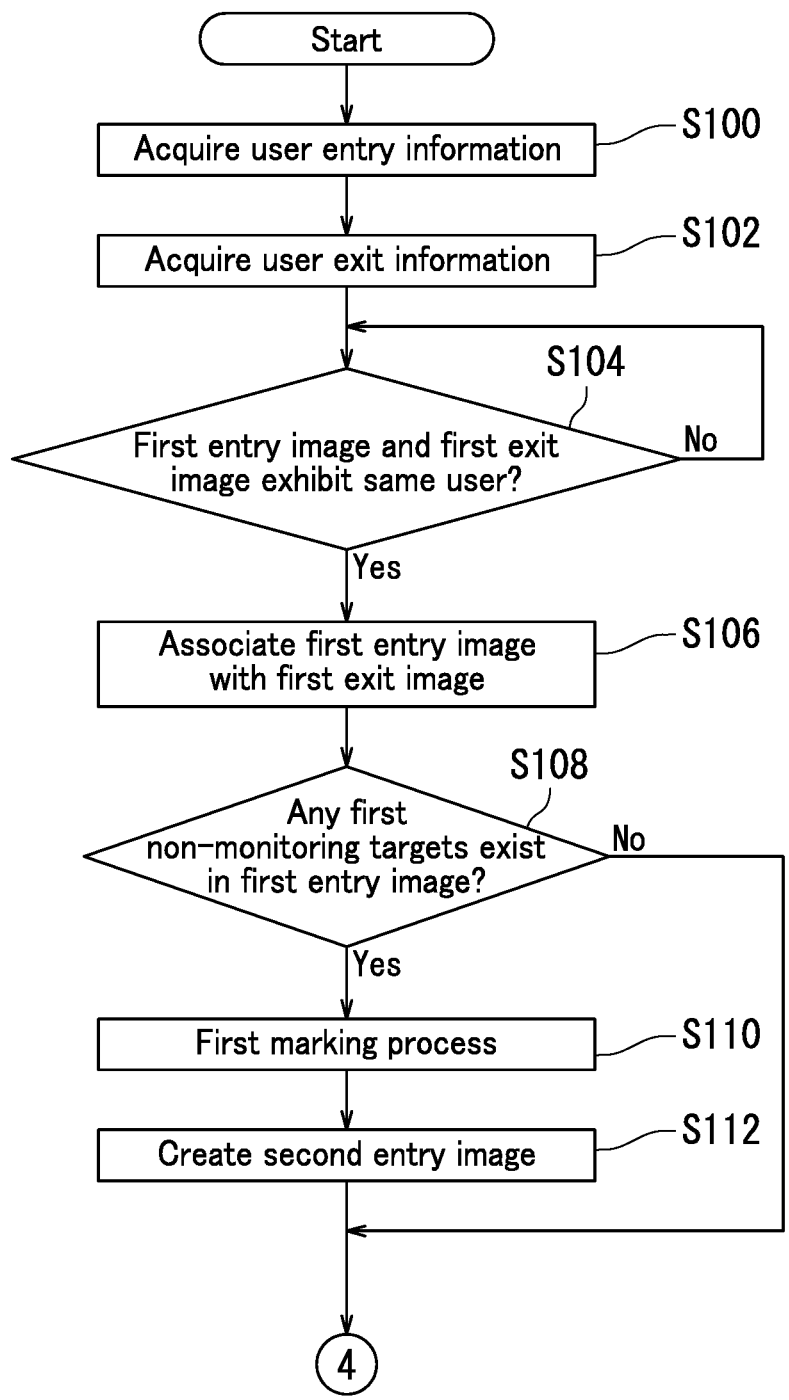
FIG. 18 is a flowchart illustrating a second difference determination process according to the fifth embodiment of the present invention.
Figure 19:
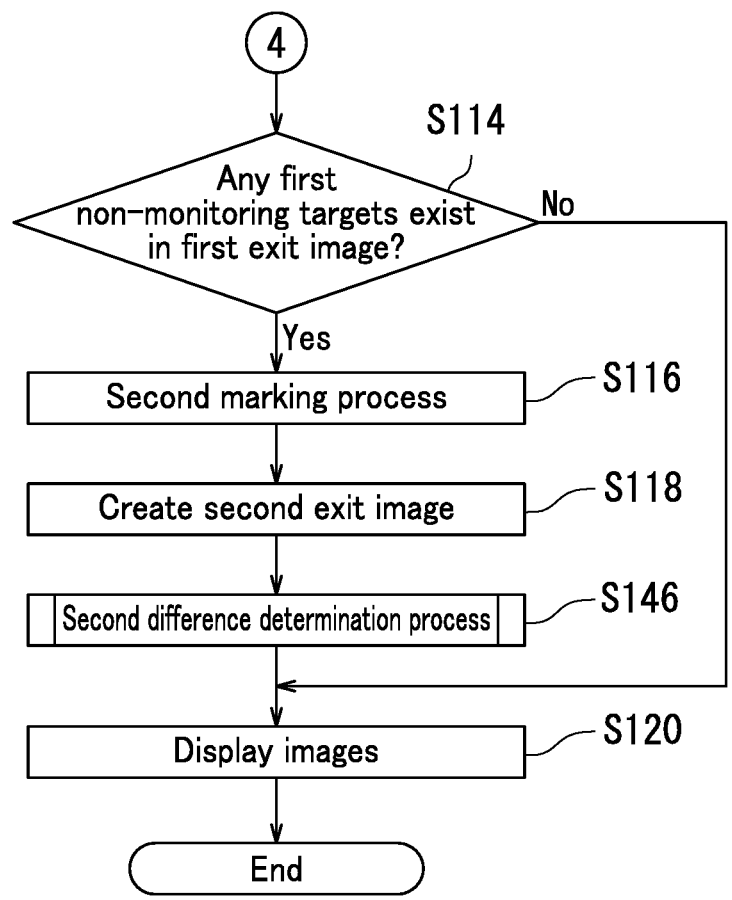
FIG. 19 is a flowchart illustrating the second difference determination process according to the fifth embodiment of the present invention.
Figure 20:
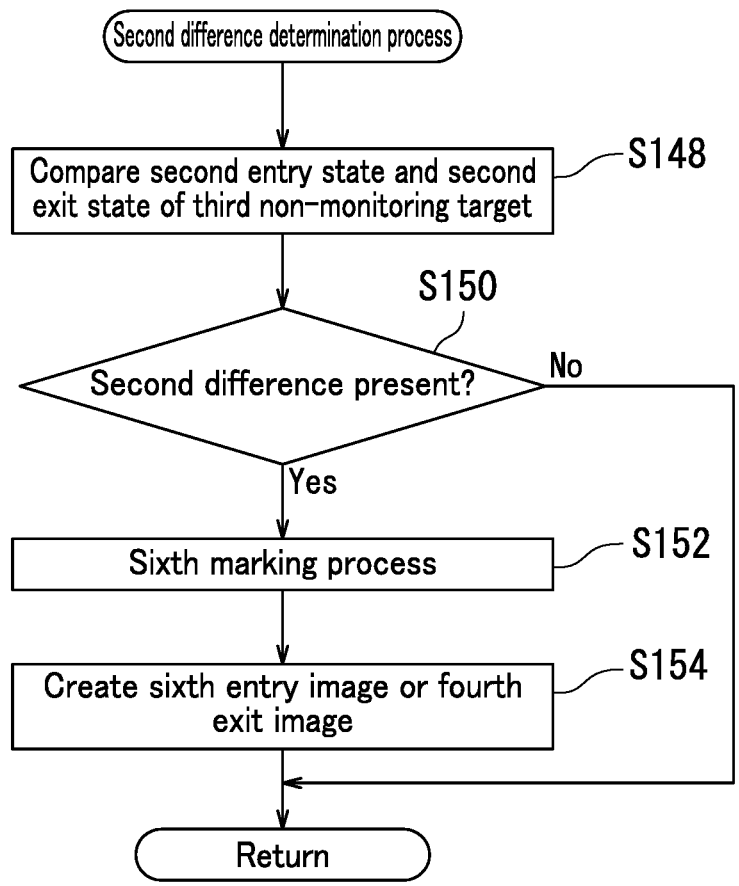
FIG. 20 is a flowchart illustrating the second difference determination process according to the fifth embodiment of the present invention.

The following describes the second difference determination process with reference to FIGS. 18 to 20. FIGS. 18 to 20 are flowcharts illustrating the second difference determination process according to the fifth embodiment.

In the fifth embodiment, as in the first embodiment, the second image creation process is performed first as illustrated in FIGS. 18 and 19 (Steps S100 to S118).

Next, the second difference determination process is performed (Step S146). Specifically, as illustrated in FIG. 20, the controller 14 compares a second entry state of a third non-monitoring target at a time of entry into the specific area and a second exit state of the third non-monitoring target at a time of exit from the specific area based on the user entry information and the user exit information of the third non-monitoring target (Step S148). The controller 14 determines whether or not there is a second difference between the second entry state and the second exit state (Step S150).

Upon determining that there is no second difference (No in Step S150), the controller 14 ends the second difference determination process without performing the sixth marking process. Upon determining that there is a second difference (Yes in Step S150), the controller 14 performs the sixth marking process on an image of the second difference in the second entry image (Step S152) to create a sixth entry image (Step S154). Alternatively, the controller 14 performs the sixth marking process on an image of the second difference in the second exit image (Step S152) to create a fourth exit image (step S154).

The image display section 18 further displays the sixth entry image or the fourth exit image in addition to the first entry image or the second entry image and the first exit image or the second exit image (Step S120).

Note that the present embodiment has been described with reference to FIGS. 18 to 20 using the example in which the first monitoring target and the third non-monitoring target enter the specific area at different times. The second difference determination process according to the fifth embodiment may be performed even in a situation in which the first monitoring target and the third non-monitoring target enter the specific area concurrently.

The monitoring terminal device 2 according to the fifth embodiment displays, on the image display section, the sixth entry image or the fourth exit image including the image of the second difference between the first entry state and the first exit state of the third non-monitoring target. Thus, the monitoring terminal device 2 according to the fifth embodiment enables easy recognition of a difference in the state of the third non-monitoring target, who has a relationship with the first monitoring target, between entry and exit of the third non-monitoring target, and thus enables efficient monitoring of the third non-monitoring target even in a situation in which a plurality of users enter the specific area.

Sixth Embodiment

The following describes the monitoring terminal device 2 according to a sixth embodiment with reference to FIGS. 3, 12, 21, 22, 23, and 24. The sixth embodiment differs from the third embodiment in that the sixth embodiment further has a time bar creation process. The following describes the sixth embodiment based on differences compared to the third embodiment and omits description of matter that is the same as for the third embodiment.

The storage stores the user entry information and the user exit information in association with a corresponding image set. The user entry information includes an entry time at which a user entered the specific area and a gate through which the user entered the specific area. The user exit information includes an exit time at which the user exited the specific area and a gate through which the user exited the specific area.

Based on the user exit information and a second entry image, the controller 14 specifies a second non-monitoring target using the first exit time at which a first monitoring target exited the specific area as a reference. The second non-monitoring target is a user who exited the specific area before the first exit time, a user who exited the specific area at the first exit time, or a user who exited the specific area after the first exit time. The controller 14 performs the fourth marking process on an image of the second non-monitoring target in the second entry image to create a fourth entry image. The controller 14 creates a time bar indicating the first exit time and second exit times at which first non-monitoring targets exited the specific area based on the user entry information and the user exit information.

The time bar has marks at locations corresponding to the first exit time and the second exit times. Upon the monitoring personnel selecting an image of a first non-monitoring target on a first entry image or a second entry image by using the input section 16, a flag is appended and displayed at a location corresponding to the relevant second exit time on the time bar.

The image display section 18 further displays the fourth entry image and the time bar.

Figure 21:
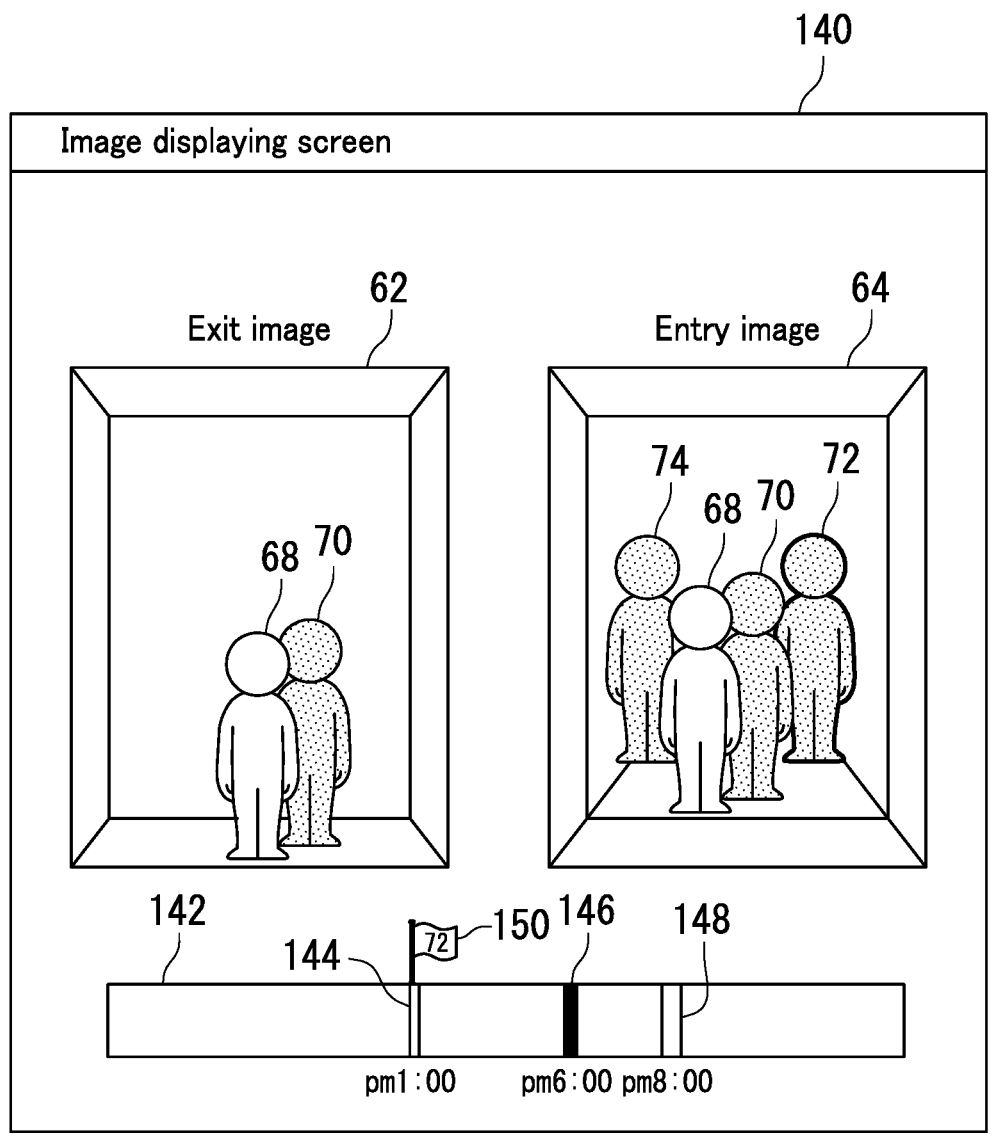
FIG. 21 is a diagram illustrating an example of an image displaying screen displayed on an image display section of a monitoring terminal device according to a sixth embodiment of the present invention.

FIG. 21 is a diagram illustrating an example of an image displaying screen displayed on the image display section of the monitoring terminal device 2 according to the sixth embodiment. In FIG. 21, the first marking process, the second marking process, and the fourth marking process have been performed. The fourth marking process is the same process as the fourth marking process described for the third embodiment.

An image displaying screen 140 further includes a time bar 142. The time bar 142 includes marks 144, 146, and 148. The mark 144 indicates a time window of exit of the user 72, who is a first non-monitoring target. The mark 146 indicates a time window of exit of the users 68 and 70. The mark 148 indicates a time window of exit of the user 74, who is a first non-monitoring target. Exit times are appended under the respective marks 144, 146, and 148. The exit times appended under the marks 144 and 148 are second exit times. The exit time appended under the mark 146 is a first exit time and a second exit time. A flag 150 is appended above the mark 144. The number 72 shown in the flag indicates the user 72. The image displaying screen 140 shows a situation in which the monitoring personnel has selected the user 72 by using the input section 16.

Since a flag is appended to the time bar upon the monitoring personnel selecting a first non-monitoring target, the image displaying screen 140 can tell temporal relationship of the second exit time of the first non-monitoring target with the first exit time and with the second exit times of the other first non-monitoring targets. Thus, the monitoring terminal device 2 according to the sixth embodiment enables easy recognition of the exit time of the first monitoring target, the exit time of the second monitoring target, and temporal relationship of the exit time of the first non-monitoring target with the exit time of the first monitoring target.

Figure 22:
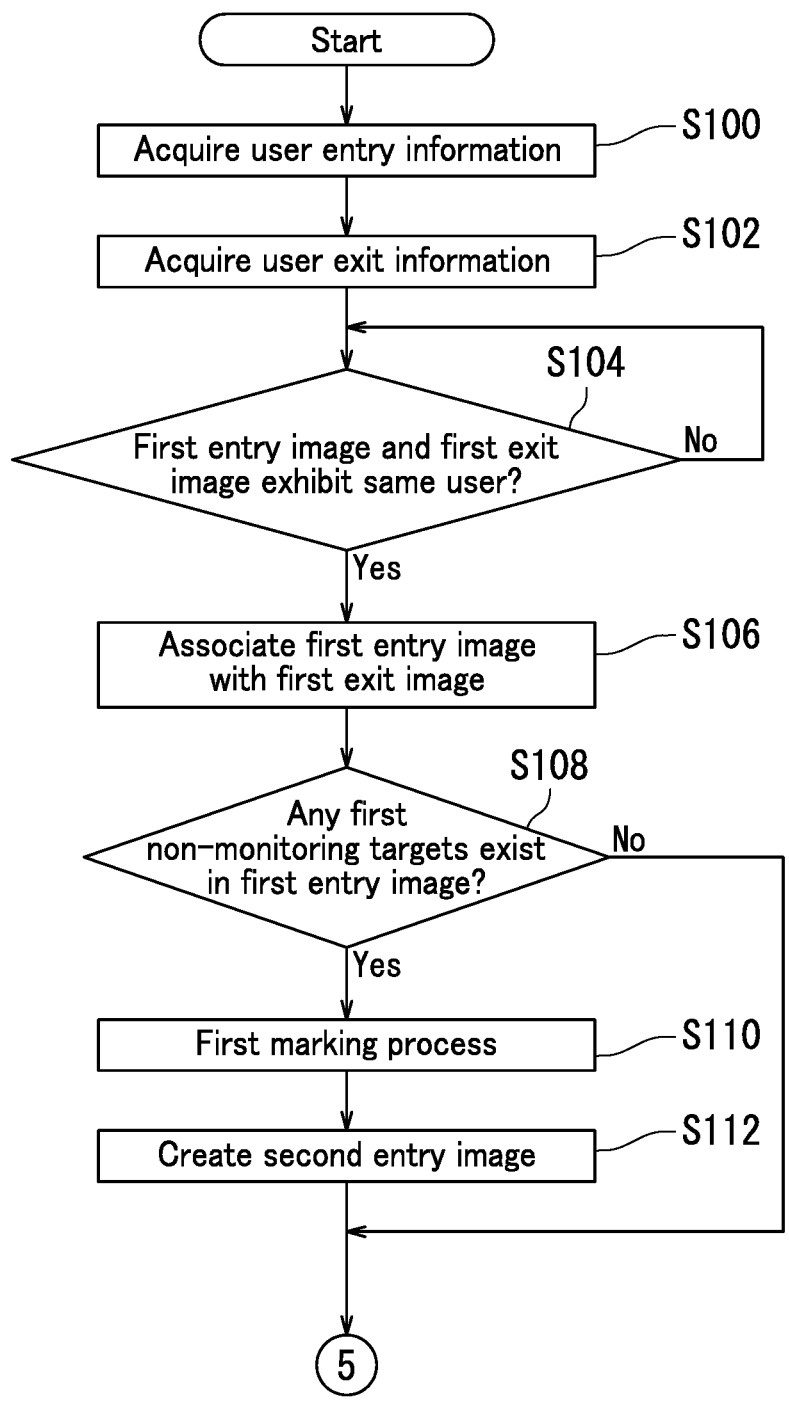
FIG. 22 is a flowchart illustrating a fourth entry image and a time bar displaying process according to the sixth embodiment of the present invention.
Figure 23:
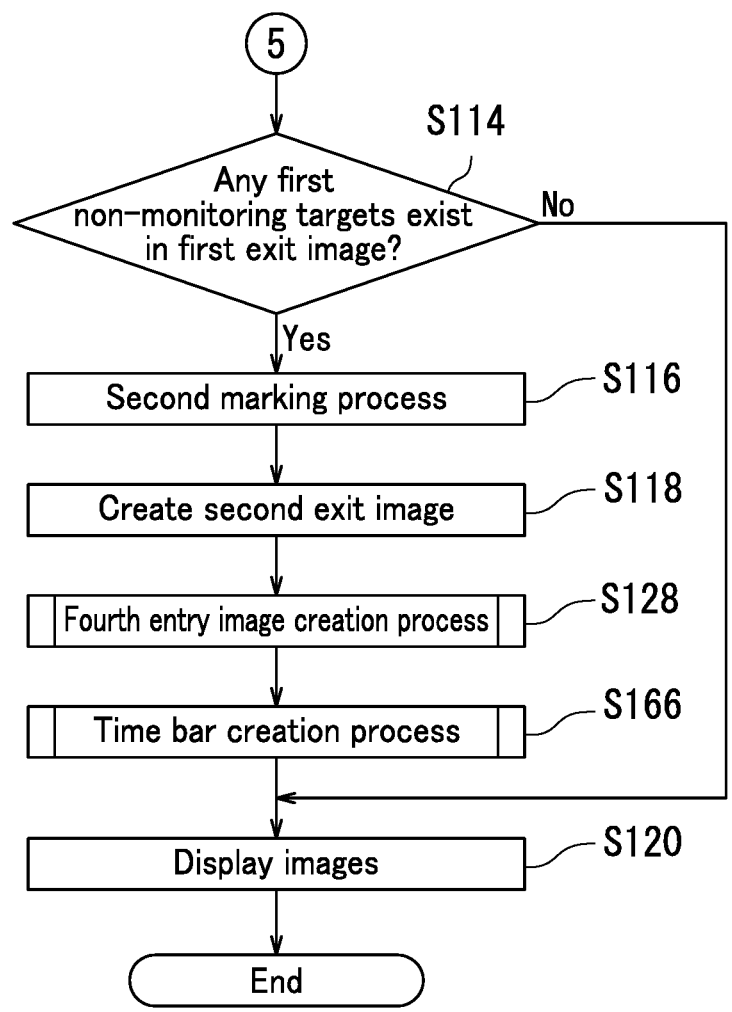
FIG. 23 is a flowchart illustrating the fourth entry image and the time bar displaying process according to the sixth embodiment of the present invention.
Figure 24:
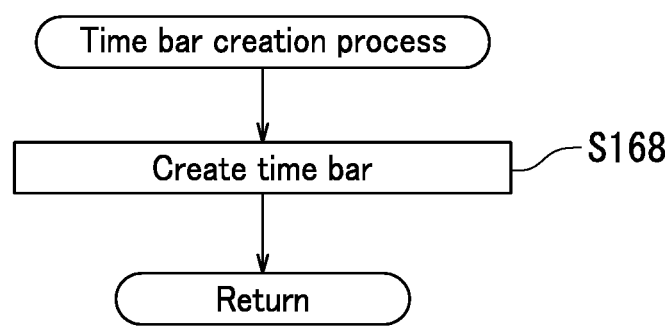
FIG. 24 is a flowchart illustrating the fourth entry image and the time bar displaying process according to the sixth embodiment of the present invention.

The following describes the fourth entry image creation process and the time bar creation process with reference to FIGS. 22 to 24. FIGS. 22 to 24 are flowcharts illustrating the fourth entry image creation process and the time bar creation process according to the sixth embodiment.

In the sixth embodiment, as in the third embodiment, the second image creation process (Steps S100 to S118) and the fourth entry image creation process (Steps S128 to S134) are performed first as illustrated in FIGS. 12, 22, and 23.

Next, the time bar creation process is performed (Step S166). Specifically, as illustrated in FIG. 24, the controller 14 creates a time bar indicating a first exit time and second exit times at which first non-monitoring targets exited the specific area based on the user entry information and the user exit information (Step S168). The controller 14 further displays the time bar on the image display section 18 (Step S120).

Displaying the time bar, the monitoring terminal device 2 according to the sixth embodiment enables easy recognition of exit times of a plurality of users, temporal relationship among the exit times, and relationship between the first monitoring target and each first non-monitoring target in terms of time. Thus, the monitoring terminal device 2 according to the sixth embodiment enables efficient monitoring of a plurality of users.

Seventh Embodiment

Figure 25:
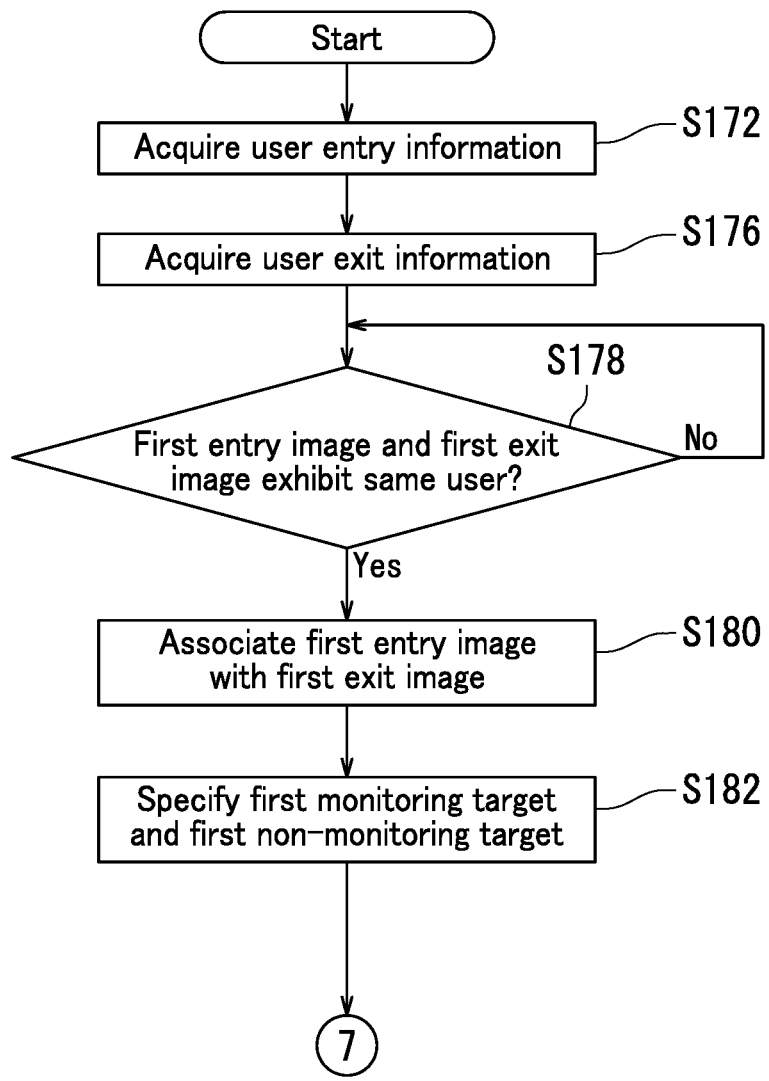
FIG. 25 is a flowchart illustrating a display processing method according to a seventh embodiment of the present invention.
Figure 26:
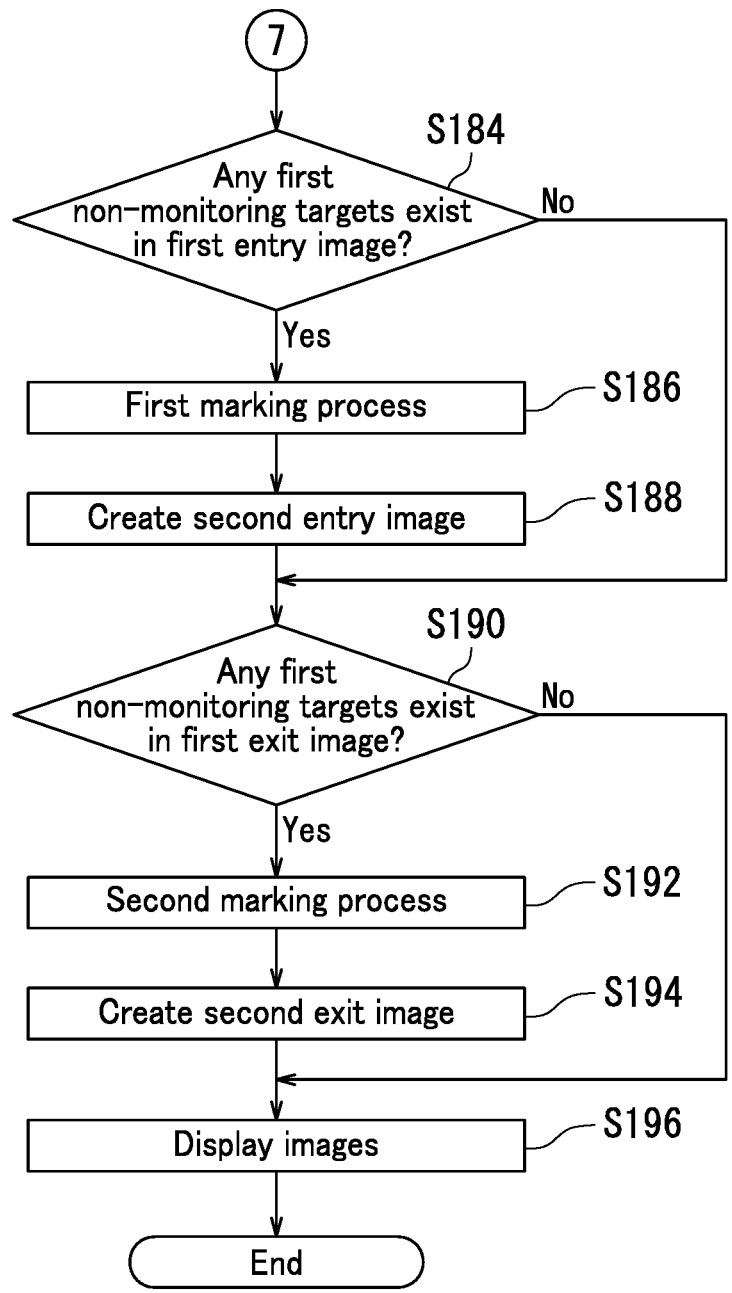
FIG. 26 is a flowchart illustrating the display processing method according to the seventh embodiment of the present invention.

The following describes a display processing method according to a seventh embodiment with reference to FIGS. 3, 25, and 26. The seventh embodiment is substantially the same as the first embodiment. The following describes the seventh embodiment and omits description of matter that is the same as for the first embodiment as much as possible. FIGS. 25 and 26 are flowcharts illustrating the display processing method according to the seventh embodiment.

The monitoring terminal device 2 implements the display processing method. The display processing method includes primarily acquiring, secondarily acquiring, primarily determining, image set creating, specifying, performing the first marking process, performing the second marking process, and image displaying.

In the primarily acquiring, the controller 14 acquires the user entry information from a first entry image exhibiting one or more users entering the specific area that is received by the reception section 10 (Step S172). In the secondarily acquiring, the controller 14 acquires the user exit information from a first exit image exhibiting one or more users exiting the specific area that is received by the reception section 10 (step S176). In the primarily determining, the controller 14 determines whether or not the first entry image and the first exit image exhibit the same user based on the first entry image, the user entry information, the first exit image, and the user exit information (Step S178). Upon the controller 14 determining that the first entry image and the first exit image do not exhibit the same user in the primarily determining (No in Step S178), the primarily determining is performed on another first exit image, and is repeated until a first exit image exhibiting the same user as the first entry image is found. Upon determining that the first entry image and the first exit image exhibit the same user in the primarily determining (Yes in Step S178), the controller 14 associates the first entry image with the first exit image to create an image set with respect to this specific user (Step S180).

In the specifying, upon the monitoring personnel determining to monitor one of the users entering the specific area among all users exhibited by the first entry image displayed on the image display section 18, the controller 14 specifies each of the users entering the specific area as a first monitoring target or a first non-monitoring target based on a result of the determination (Step S182). The controller 14 determines whether or not any images of first non-monitoring targets exist in the first entry image (Step S184). Upon determining that no images of first non-monitoring targets exist in the first entry image (No in Step S184), the controller 14 proceeds to Step S190 without performing the first marking process. In the performing the first marking process, upon determining that one or more images of first non-monitoring targets exist in the first entry image (Yes in Step S184), the controller 14 performs the first marking process on the images of the first non-monitoring targets in the first entry image (Step S186) to create a second entry image (Step S188). The controller 14 determines whether or not any images of first non-monitoring targets exist in the first exit image (Step S190). Upon determining that no images of first non-monitoring targets exist in the first exit image (No in Step S190), the controller 14 proceeds to Step S196 without performing the second marking process. In the performing the second marking process, upon determining that one or more images of first non-monitoring targets exist in the first exit image (Yes in Step S190), the controller 14 specifies each of the users exhibited by the first exit image subjected to the first marking process as a first monitoring target or a first non-monitoring target based on the result of the determination. In the performing the second marking process, the controller 14 then performs the second marking process on images of the first monitoring target and the first non-monitoring targets (Step S192) to create a second exit image (Step S194). In the image displaying, the controller 14 displays, on the image display section 18, the first entry image or the second entry image that includes the image of the first monitoring target and the first exit image or the second exit image that includes the image of the same monitoring target (Step S196).

The display processing method according to the seventh embodiment displays a second image created through either or both of the first marking process and the second marking process. It is therefore possible for the monitoring personnel to easily recognize a user to monitor and efficiently monitor the user through visual perception even in a situation in which a plurality of users enter and exit the specific area.

INDUSTRIAL APPLICABILITY

The present invention is applicable to the field of electrical devices.

The invention claimed is:

1. A monitoring terminal device for monitoring at least one user entering a specific area through an entrance gate of the specific area and at least one user exiting the specific area through an exit gate of the specific area, either or both of the at least one user entering the specific area and the at least one user exiting the specific area being a plurality of users, the monitoring terminal device comprising:
   a controller; and
   an image display section, wherein
   the controller acquires a first entry image including one or more images of one or more users entering the specific area and specifies each of the users entering the specific area as a first monitoring target or a first non-monitoring target in the first entry image,
   the controller performs a first marking process on the image of every first monitoring target or the image of every first non-monitoring target in the first entry image to create a second entry image,
   the controller acquires a first exit image including one or more images of one or more users exiting the specific area and exhibiting the first monitoring target included in the first entry image subjected to the first marking process, and specifies each of the users exiting the specific area as the first monitoring target or the first non-monitoring target in the first exit image,
   the controller performs a second marking process on the image of every first monitoring target or the image of every first non-monitoring target in the first exit image to create a second exit image, and
   the image display section displays at least one of the second entry image including the image of the first monitoring target and the second exit image including the image of the same first monitoring target.

2. The monitoring terminal device according to claim 1, further comprising:
   a reception section;
   storage; and
   an input section, wherein
   the reception section receives the first entry image and the first exit image,
   the controller acquires user entry information indicating the respective users entering the specific area based on the first entry image and user exit information indicating the respective users exiting the specific area based on the first exit image,
   the storage stores therein the first entry image, the first exit image, the user entry information, and the user exit information,
   the controller determines whether or not the first entry image and the first exit image exhibit the same user based on the user entry information and the user exit information,
   upon the controller determining that the first entry image and the first exit image exhibit the same user, the storage stores the first entry image and the first exit image exhibiting the same user in association with each other as an image set with respect to this specific user,
   the image display section displays the first entry image,
   with respect to each of the users entering the specific area included in the first entry image displayed on the image display section, monitoring personnel who performs monitoring determines whether or not to monitor the user by using the input section,
   the controller specifies each of the users entering the specific area as the first monitoring target or the first non-monitoring target based on a result of the determination,
   the controller performs the first marking process on the image of every first monitoring target or the image of every first non-monitoring target in the first entry image to create the second entry image,
   the controller acquires the first exit image associated with the first entry image subjected to the first marking process as part of the image set with respect to the first monitoring target and specifies each of the users included in the first exit image as the first monitoring target or the first non-monitoring target based on the result of the determination,
   the controller performs the second marking process on the image of every first monitoring target or the image of every first non-monitoring target in the first exit image to create the second exit image,
   the storage stores the second entry image and the second exit image in association with the image set, and
   the image display section displays the first entry image or the second entry image that includes the image of the first monitoring target and the first exit image or the second exit image that includes the image of the same first monitoring target.

3. The monitoring terminal device according to claim 2, wherein
   in a situation in which one or more first non-monitoring targets exit the specific area concurrently with a first monitoring target, and at least one of the first non-monitoring targets exiting the specific area concurrently with the first monitoring target did not enter the specific area concurrently with the first monitoring target, the controller determines whether or not to perform a third marking process on an image of the at least one first non-monitoring target exhibited by a first entry image associated with the first exit image subjected to the second marking process as part of the image set with respect to the at least one first non-monitoring target, upon determining to perform the third marking process, the controller performs the third marking process on the image of the at least one first non-monitoring target in the first entry image to create a third entry image, and the image display section further displays the third entry image.

4. The monitoring terminal device according to claim 2, wherein the user entry information includes a time of entry into the specific area and a gate used for entry, the user exit information includes a time of exit from the specific area and a gate used for exit, the storage stores the user entry information and the user exit information in association with the image set, based on the user exit information and the second entry image, the controller specifies a second non-monitoring target using a first exit time at which the first monitoring target exited the specific area as a reference, the second non-monitoring target is a user who exited the specific area before the first exit time, a user who exited the specific area at the first exit time, or a user who exited the specific area after the first exit time, the controller performs a fourth marking process on an image of the second non-monitoring target in the second entry image to create a fourth entry image, and the image display section further displays the fourth entry image.

5. The monitoring terminal device according to claim 2, wherein the controller compares a first entry state of the first monitoring target at a time of entry into the specific area and a first exit state of the first monitoring target at a time of exit from the specific area based on the user entry information and the user exit information of the first monitoring target to determine whether or not there is a first difference between the first entry state and the first exit state, upon determining that there is the first difference, the controller performs a fifth marking process on an image of the first difference in the first entry image or the second entry image to create a fifth entry image, or performs the fifth marking process on an image of the first difference in the first exit image or the second exit image to create a third exit image, and the image display section further displays the fifth entry image or the third exit image.

6. The monitoring terminal device according to claim 2, wherein a first non-monitoring target exiting the specific area concurrently with the first monitoring target is a third non-monitoring target, the controller compares a second entry state of the third non-monitoring target at a time of entry into the specific area and a second exit state of the third non-monitoring target at a time of exit from the specific area based on the user entry information and the user exit information of the third non-monitoring target, the controller determines whether or not there is a second difference between the second entry state and the second exit state, upon determining that there is the second difference, the controller performs a sixth marking process on an image of the second difference in the second entry image to create a sixth entry image, or performs the sixth marking process on an image of the second difference in the second exit image to create a fourth exit image, and the image display section further displays the sixth entry image or the fourth exit image.

7. The monitoring terminal device according to claim 2, wherein the user entry information includes a time of entry into the specific area and a gate used for entry, the user exit information includes a time of exit from the specific area and a gate used for exit, the storage stores the user entry information and the user exit information in association with the image set, based on the user exit information and the second entry image, the controller specifies a second non-monitoring target using a first exit time at which the first monitoring target exited the specific area as a reference, the second non-monitoring target is a user who exited the specific area before the first exit time, a user who exited the specific area at the first exit time, or a user who exited the specific area after the first exit time, the controller performs a fourth marking process on an image of the second non-monitoring target in the second entry image to create a fourth entry image, the controller creates a time bar indicating the first exit time and a second exit time at which the first non-monitoring target exited the specific area based on the user entry information and the user exit information, the time bar has marks at locations corresponding to the first exit time and the second exit time, upon the monitoring personnel selecting the image of the first non-monitoring target on the first entry image or the second entry image by using the input section, a flag is appended and displayed at a location corresponding to the second exit time on the time bar, and the image display section further displays the fourth entry image and the time bar.

8. The monitoring terminal device according to claim 2, wherein the entrance gate and the exit gate are different gates.

9. The monitoring terminal device according to claim 2, wherein the specific area has either or both of a plurality of gates as the entrance gate and a plurality of gates as the exit gate.

10. The monitoring terminal device according to claim 1, wherein the first marking process is a process of reducing brightness of the image of every first non-monitoring target, a process of increasing brightness of the image of every first monitoring target, a process of adding a color to the image of every first monitoring target, or a process of outlining a contour of the image of every first monitoring target.

11. The monitoring terminal device according to claim 1, wherein the second marking process is a process of reducing brightness of the image of every first non-monitoring target, a process of increasing brightness of the image of every first monitoring target, a process of adding a color to the image of every first monitoring target, or a process of outlining a contour of the image of every first monitoring target.

12. A display processing method that is performed by a monitoring terminal device including a reception section, a controller, storage, an image display section, and an input section, the display processing method comprising implementation by the controller of:
- primarily acquiring user entry information from a first entry image received by the reception section, the first entry image exhibiting one or more users entering a specific area, the user entry information indicating the respective users entering the specific area;
- secondarily acquiring user exit information from a first exit image received by the reception section, the first exit image exhibiting one or more users exiting the specific area, the user exit information indicating the respective users exiting the specific area;
- primarily determining whether or not the first entry image and the first exit image exhibit the same user based on the first entry image, the user entry information, the first exit image, and the user exit information;
- creating, upon the controller determining that the first entry image and the first exit image exhibit the same user in the primarily determining, an image set with respect to this specific user by associating the first entry image and the first exit image with each other;
- specifying each of the users entering the specific area among all users exhibited by the first entry image displayed on the image display section as a first monitoring target or a first non-monitoring target based on a result of determination by monitoring personnel who performs monitoring, upon the monitoring personnel determining to monitor one of the users entering the specific area;
- performing a first marking process on an image of every first monitoring target or an image of every first non-monitoring target in the first entry image to create a second entry image;
- performing, after the controller specifying each of the users exhibited by the first exit image subjected to the first marking process as the first monitoring target or the first non-monitoring target based on the result of the determination, a second marking process on an image of every first monitoring target or an image of every first non-monitoring target in the first exit image to create a second exit image; and
- displaying the first entry image or the second entry image that includes the image of the first monitoring target and the first exit image or the second exit image that includes the image of the same first monitoring target on the image display section.

* * * * *